US011027380B2

(12) United States Patent
Passerini et al.

(10) Patent No.: US 11,027,380 B2
(45) Date of Patent: Jun. 8, 2021

(54) SPINDLE APPARATUS FOR USE AT A MACHINE TOOL, IN PARTICULAR A LATHE, AND MACHINE TOOL WITH SUCH SPINDLE APPARATUS

(71) Applicant: GILDEMEISTER ITALIANA S.P.A., Brembate di Sopra (IT)

(72) Inventors: Mirko Passerini, Gaggiano (IT); Valter Ginami, Bergamo (IT)

(73) Assignee: GILDEMEISTER ITALIANA S.P.A., Brembate de Sopra (IT)

( * ) Notice: Subject to any disclaimer, the term of this patent is extended or adjusted under 35 U.S.C. 154(b) by 29 days.

(21) Appl. No.: 16/253,693

(22) Filed: Jan. 22, 2019

(65) Prior Publication Data

US 2019/0224791 A1 Jul. 25, 2019

(30) Foreign Application Priority Data

Jan. 19, 2018 (EP) .................................. 18152652
Jul. 31, 2018 (EP) .................................. 18186551

(51) Int. Cl.
*B23Q 1/76* (2006.01)
*B23B 7/04* (2006.01)
(Continued)

(52) U.S. Cl.
CPC ................ *B23Q 1/766* (2013.01); *B23B 7/04* (2013.01); *B23B 7/06* (2013.01); *B23B 7/10* (2013.01);
(Continued)

(58) Field of Classification Search
CPC .. B23Q 1/763; B23Q 1/766; B23Q 2220/006; B23B 2231/20; B23B 2260/044; B23B 7/06; B23B 7/10
See application file for complete search history.

(56) References Cited

U.S. PATENT DOCUMENTS 2,430,449 A 11/1947 Brown
6,241,616 B1 6/2001 Lightcap
2011/0179918 A1 7/2011 Baumann

FOREIGN PATENT DOCUMENTS

DE 136172 A1 6/1979
DE 4103552 A1 8/1992
(Continued)

OTHER PUBLICATIONS

EP-2388092-A1, English Translation (Year: 2011).*
May 9, 2019 extended European Search Report issued in European Patent Application No. 18186551.0.

*Primary Examiner* — Sara Addisu
(74) *Attorney, Agent, or Firm* — Oliff PLC

(57) ABSTRACT

A spindle apparatus for use at a machine tool, in particular a lathe, has: a spindle assembly including a workpiece spindle to receive an elongated workpiece and a spindle motor for driving spindle rotation; and a rotary guide-bush assembly axially arranged with the workpiece spindle, the rotary guide-bush assembly including a rotary guide-bush to receive the elongated workpiece and supported at the rotary guide-bush assembly to rotate with the elongated workpiece received in the workpiece spindle about the axis while enabling a movement of the elongated workpiece in the axial direction. The spindle and rotary guide-bush assemblies connect to each other by a torque transferring connection, between the spindle and rotary guide-bush assemblies along the axis to transfer driving torque during acceleration or deceleration of the spindle rotation driven by the spindle motor to the rotary guide-bush of the rotary guide-bush assembly.

9 Claims, 13 Drawing Sheets

(51) Int. Cl.
*B23B 7/06* (2006.01)
*B23B 7/10* (2006.01)
*B23B 31/20* (2006.01)
*B23B 31/30* (2006.01)

(52) U.S. Cl.
CPC .......... *B23B 31/204* (2013.01); *B23B 31/302* (2013.01); *B23Q 1/763* (2013.01); *B23B 2231/20* (2013.01); *B23B 2260/044* (2013.01); *B23Q 2220/006* (2013.01)

(56) References Cited

FOREIGN PATENT DOCUMENTS

| | | |
|---|---|---|
| DE | 102012008673 A1 | 10/2013 |
| EP | 0475152 A2 | 3/1992 |
| EP | 2030707 A2 | 3/2009 |
| EP | 2388092 A1 * | 11/2011 ............ B23B 1/201 |
| EP | 2388092 A1 | 11/2011 |
| EP | 2163334 B2 | 8/2016 |
| JP | S5585201 U | 6/1980 |
| JP | S56119304 A | 9/1981 |
| JP | 859171002 U | 11/1984 |
| WO | 2014/203671 A1 | 12/2014 |
| WO | 2016/199047 A1 | 12/2016 |
| WO | 2017/047558 A1 | 3/2017 |

\* cited by examiner

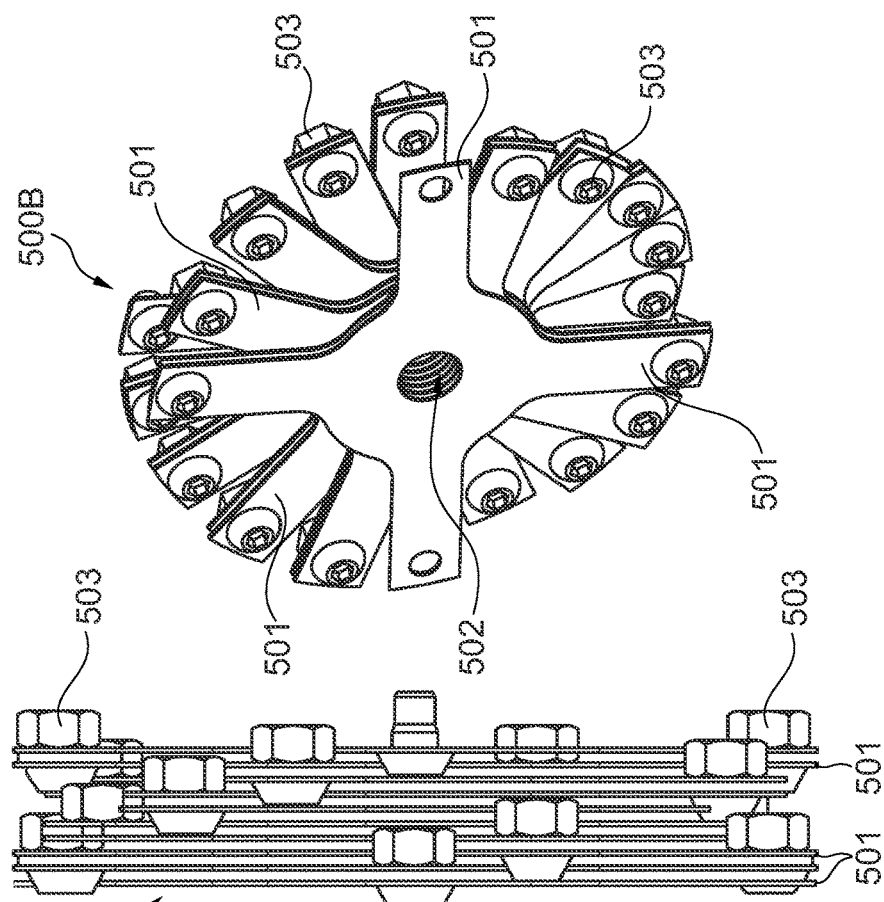
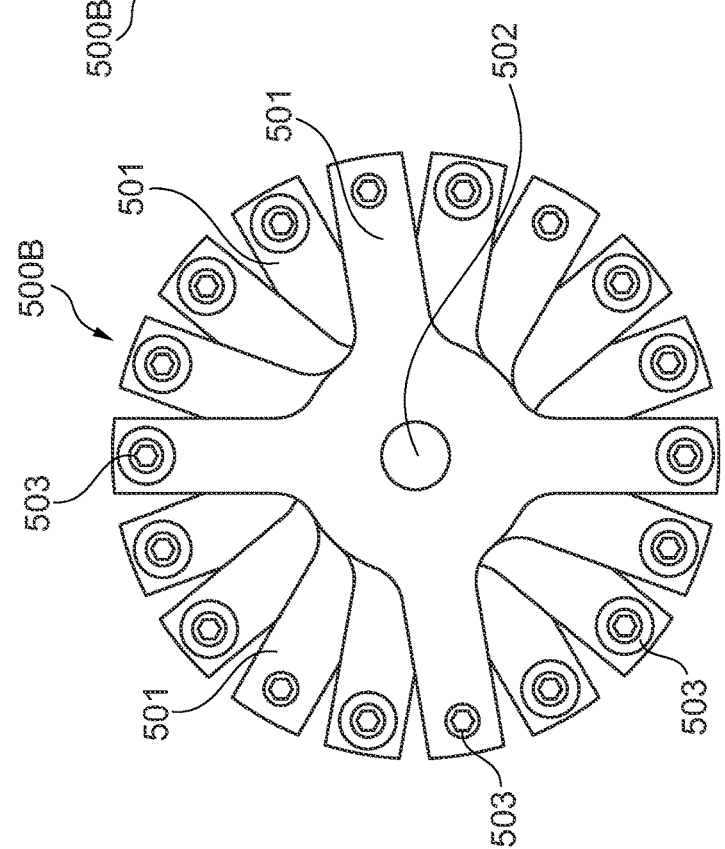
Fig. 5C
Fig. 5B
Fig. 5A

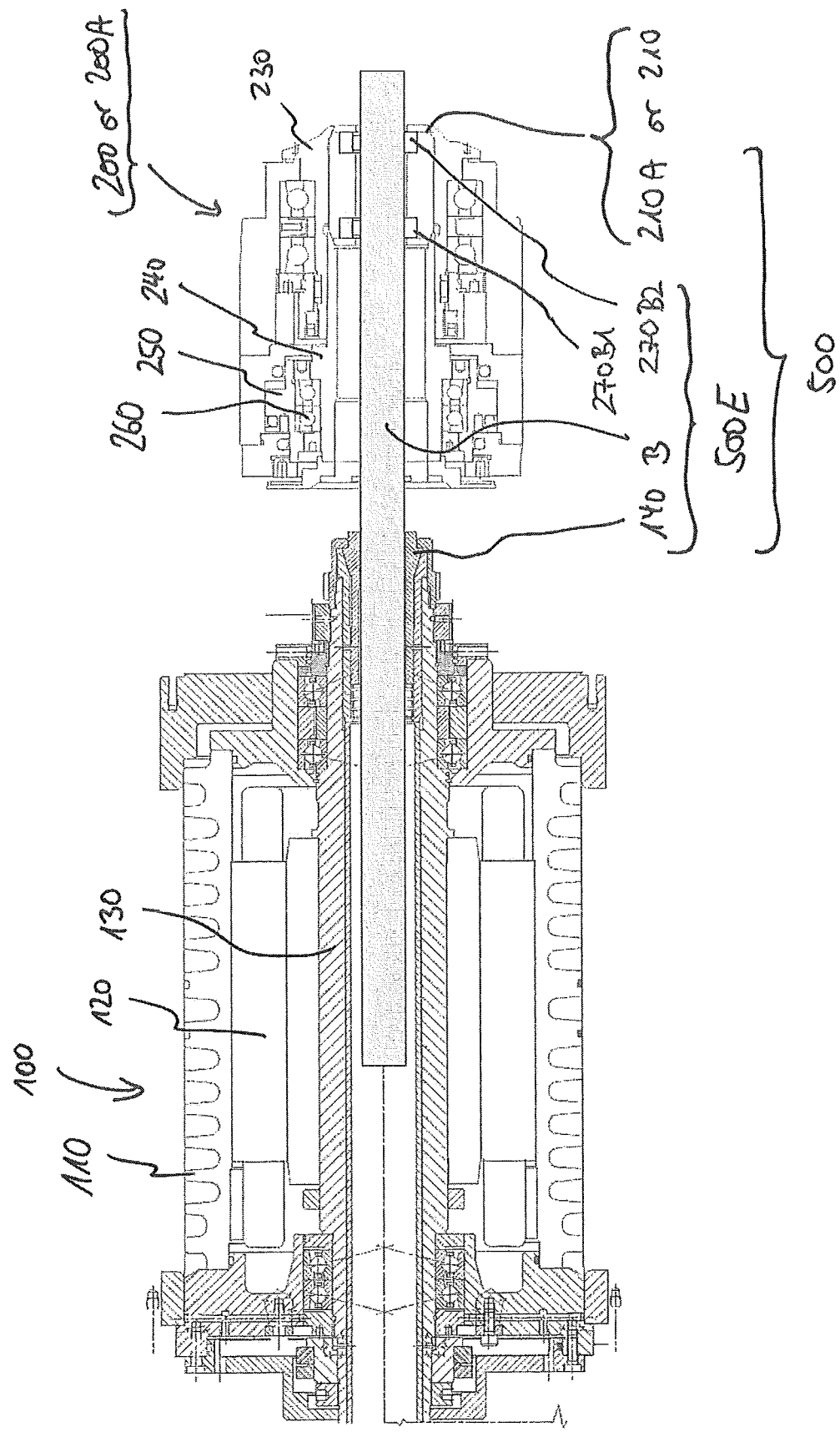

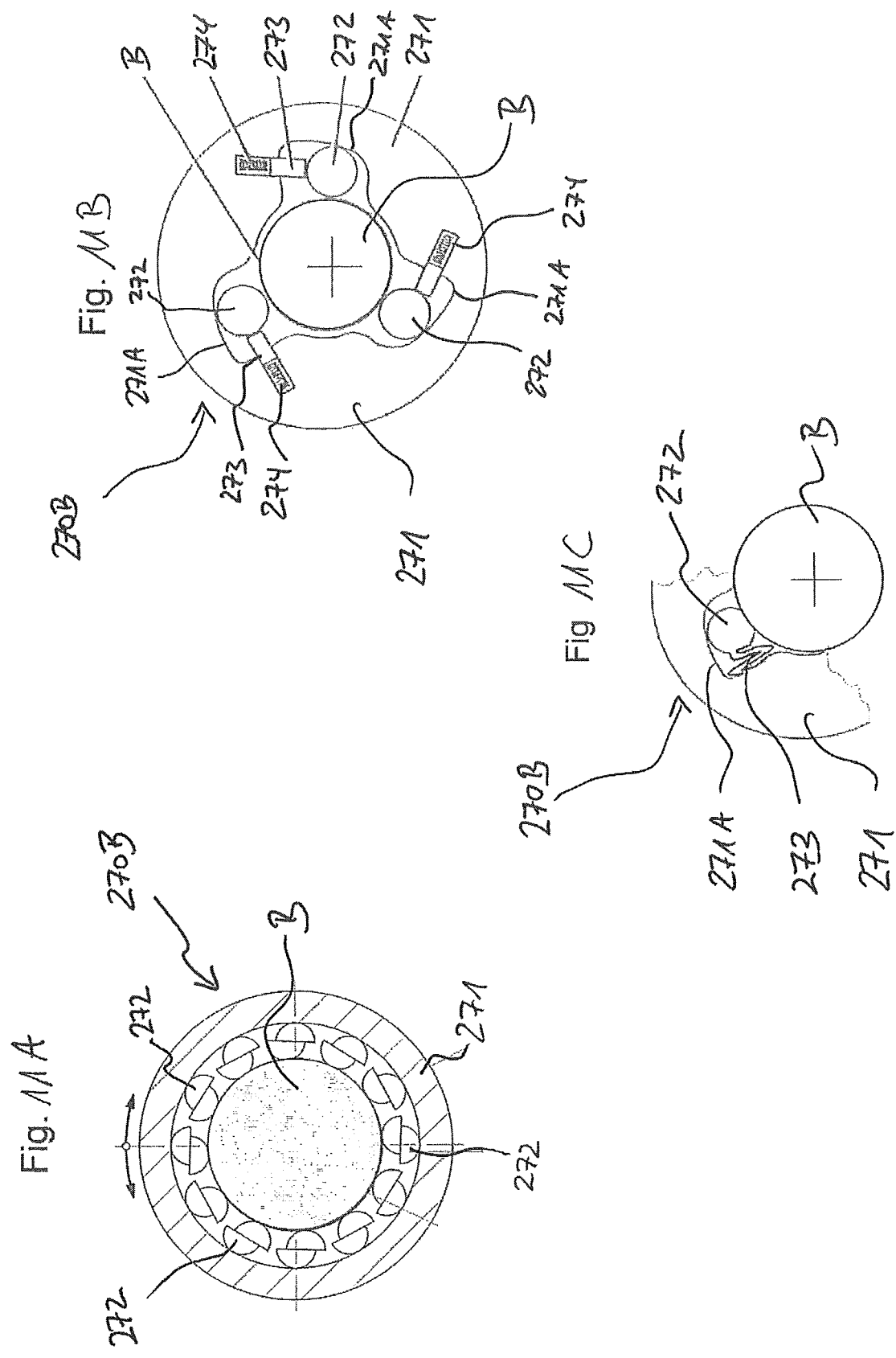

SPINDLE APPARATUS FOR USE AT A MACHINE TOOL, IN PARTICULAR A LATHE, AND MACHINE TOOL WITH SUCH SPINDLE APPARATUS

The present disclosure relates to a spindle apparatus for use at a machine tool, in particular a lathe, and a machine tool, in particular a lathe, comprising such spindle apparatus.

BACKGROUND

Machine tools with one or more workpiece-carrying spindles are known in the prior art, such as e.g. lathes or turning machines, turning centers, milling-turning centers or the like. This may include single-spindle lathes, double-spindle lathes or multi-spindle lathes.

For example, in the prior art, machine tools, such as multi-spindle turning machines, are known, including multiple workpiece spindles supported on a rotary drum (turret or turret body), wherein the rotary drum/turret body is configured to rotate/index the rotary drum/turret body around a longitudinal axis thereof.

See for example EP 2 163 334 B2, which discloses a multi-spindle turning machine that has multiple workpiece spindles supported on a rotary drum, wherein the rotary drum is configured to rotate/index the rotary drum around a longitudinal axis thereof, and, for each workpiece spindle there is provided a tool assembly holding one or more tools.

For relative movement between the workpieces received at the workpiece spindles and the tools of the tool assemblies, the spindles are movable in a Z-direction being axially arranged with the respective spindle axis. Further, each of the tool assemblies is configured to move in a radial X-direction with respect to the longitudinal rotation axis of the drum and in a tangential Y-direction with respect to the longitudinal rotation axis of the drum.

The workpiece spindles of the machine tool as shown in EP 2 163 334 B2 have a spindle assembly including multiple workpiece spindles being respectively configured to receive an elongated workpiece. Each spindle may have a spindle motor for driving a spindle rotation of the workpiece spindle about a spindle axis of the respective workpiece spindle. Typically, the workpieces machined at such machine tool include elongated workpieces such as elongated bars having different cross-sections and diameters.

The tip end portion of the elongated workpiece, such as a bar, extends out of the receiving portion of the spindle and is machined by tools such as cutters or mills, which applies an axial force on the workpiece. For machining lengthy and/or slender workpieces, EP 2 163 334 B2 describes the use of a so-called rotary guide-bush (or rotary guide-bushing) mounted in front of the spindle to support such lengthy and/or slender workpieces when they extend out of the spindle.

Typically, such rotary guide-bush rotates together with the workpiece about the spindle axis. FIGS. 1 and 2 describe some concepts of driven rotary guide-bushes which are actively driven to rotate about the spindle axis according to background examples. However, such driven rotary guide-bushes have rather complex and large-sized driving mechanisms.

In view of the above, it is an object of the present invention to provide to a spindle apparatus for use at a machine tool, in particular a lathe, and a machine tool, in particular a lathe, comprising such spindle apparatus which provides a driven rotary guide-bush for supporting such lengthy and/or slender workpieces when they extend out of the spindle in a cost-effective, simple and compact manner.

SUMMARY

For solving the above object, there is proposed a spindle apparatus for use at a machine tool, in particular a lathe, according to claim 1 and a machine tool, in particular a lathe, comprising such spindle apparatus according to claim 15. Dependent claims relate to preferred exemplary embodiments.

According to an aspect, there may be provided a spindle apparatus for use at a machine tool, in particular a lathe, comprising:
a spindle assembly including a workpiece spindle being configured to receive an elongated workpiece and/or a spindle motor for driving a spindle rotation of the workpiece spindle about a spindle axis of the workpiece spindle; and/or
a rotary guide-bush assembly being axially arranged with the workpiece spindle with respect to the spindle axis, the rotary guide-bush assembly preferably including a rotary guide-bush configured to receive the elongated workpiece and/or being supported at the rotary guide-bush assembly to rotate with the elongated workpiece received in the workpiece spindle about the spindle axis, preferably while enabling a movement of the elongated workpiece in the direction of the spindle axis.

In one preferred aspect, the spindle assembly and the rotary guide-bush assembly are preferably configured to connect to each other by a torque transferring connection arranged between the spindle assembly and the rotary guide-bush assembly along the spindle axis, preferably so as to transfer driving torque during acceleration or deceleration of the spindle rotation driven by the spindle motor to the rotary guide-bush synchronized with the driven acceleration or deceleration of the rotation of the workpiece spindle.

In one preferred aspect, the torque transferring connection includes an extensible joint structure attached to the spindle assembly and the rotary guide-bush assembly, wherein the extensible joint structure is preferably configured to transfer driving torque during acceleration or deceleration of the spindle rotation and being further configured to expand and/or shorten in the direction of the spindle axis.

In one preferred aspect, the torque transferring connection, in particular the extensible joint structure, includes a telescopic coupling tube mechanism having a plurality of tube elements, the telescopic coupling tube mechanism being arranged axially with respect to the spindle axis.

In other words, there may be provided a spindle apparatus for use at a machine tool, in particular a lathe, comprising: a spindle assembly including a workpiece spindle being configured to receive an elongated workpiece and/or a spindle motor for driving a spindle rotation of the workpiece spindle about a spindle axis of the workpiece spindle; and/or a rotary guide-bush assembly being axially arranged with the workpiece spindle with respect to the spindle axis, the rotary guide-bush assembly preferably including a rotary guide-bush configured to receive the elongated workpiece and/or being supported at the rotary guide-bush assembly to rotate with the elongated workpiece received in the workpiece spindle about the spindle axis, preferably while enabling a movement of the elongated workpiece in the direction of the spindle axis; wherein the spindle assembly and the rotary guide-bush assembly are preferably connected to each other by a telescopic coupling tube mechanism between the spindle assembly and the rotary guide-bush assembly along the spindle axis, preferably so as to transfer driving torque during acceleration or deceleration of the spindle rotation driven by the spindle motor to the rotary guide-bush synchronized with the driven acceleration or deceleration of the rotation of the workpiece spindle.

In one preferred aspect, the telescopic coupling tube mechanism includes tube elements of different diameters, wherein one tube element of the tube elements is preferably attached to the spindle assembly and another one of the tube elements is preferably attached to the rotary guide-bush assembly.

In one preferred aspect, the outer tube element of the telescopic coupling tube mechanism having the largest diameter among the tube elements is attached to the spindle assembly, and/or the inner tube element of the telescopic coupling tube mechanism having the smallest diameter among the tube elements is attached to the rotary guide-bush assembly.

In one preferred aspect, a plurality of through holes are preferably formed in a tube wall of the outer tube element of the telescopic coupling tube mechanism having the largest diameter among the tube elements, in particular for enabling outflow of cooling and/or lubricating liquid from the inside of the telescopic coupling tube mechanism to its outside.

In one preferred aspect, the plurality of through holes are formed along a ring-shaped portion around the longitudinal axis of the telescopic tube mechanism, in particular preferably adjacent to the attached end of the outer tube element.

In one preferred aspect, the tube elements of the telescopic coupling tube mechanism are configured to transfer the driving torque in that a rotation of the tube elements relative to each other about the spindle axis is blocked.

In one preferred aspect, the outer tube element includes, on its inner wall portion, a plurality of longitudinally extending guide protrusions preferably protruding radially inward, and an inner-next tube element, which is preferably slidably held within the outer tube element, includes, on its outer wall portion, a plurality of longitudinally extending guide protrusions preferably protruding radially outward, preferably inbetween two adjacent longitudinally extending guide protrusions of the outer tube element and/or the guide protrusions of the outer tube element protrude inbetween two adjacent guide protrusions of the inner tube element.

In one preferred aspect, the inner tube element includes, on its outer wall portion, a plurality of longitudinally extending guide protrusions preferably protruding radially outward, and an outer-next tube element, in which the inner tube element is preferably slidably held, includes, on its inner wall portion, a plurality of longitudinally extending guide protrusions preferably protruding radially inward, preferably inbetween two adjacent longitudinally extending guide protrusions of the inner tube element and/or the guide protrusions of the inner tube element protrude inbetween two adjacent guide protrusions of the outer-next tube element. In one preferred aspect, the rotary guide-bush assembly preferably includes a clamping portion configured to clamp the elongated workpiece, which is received in the rotary guide-bush and in the workpiece spindle, preferably so as to transfer driving torque applied from the spindle motor during a driven acceleration or deceleration of the rotation of the workpiece spindle through the clamped elongated workpiece for driving a rotation of the rotary guide-bush synchronized with the driven acceleration or deceleration of the rotation of the workpiece spindle.

In one preferred aspect, the clamping portion includes a rotary guide-bush collet operable to be switched to two clamping states.

In one preferred aspect, the rotary guide-bush collet is configured to clamp the elongated workpiece, which is received in the rotary guide-bush and in the workpiece spindle, rigidly when the rotary guide-bush collet is switched to a first clamping state of the two clamping states so as to enable transfer driving torque applied from the spindle motor during a driven acceleration of the rotation of the workpiece spindle through the clamped elongated workpiece for driving a rotation of the rotary guide-bush synchronized with the driven acceleration of the rotation of the workpiece spindle.

That is, in the first clamping state, the rotary guide-bush collet is configured to clamp the elongated workpiece rigidly so as to allow for torque transfer through the clamped state between the clamping rotary guide-bush collet and the clamped workpiece, wherein the first clamping state does not allow for movement of the elongated workpiece into the direction of the spindle axis.

In one preferred aspect, the rotary guide-bush collet is configured to clamp the elongated workpiece, which is received in the rotary guide-bush and in the workpiece spindle, when the rotary guide-bush collet is switched to a second clamping state of the two clamping states so as allow for movement of the elongated workpiece into the direction of the spindle axis.

That is, in the second clamping state, the rotary guide-bush collet is configured to clamp the elongated workpiece not rigidly or specifically more loosely than in the first clamping state, e.g. with less clamping pressure or clamping force, so as to allow for movement of the clamped workpiece into the direction of the spindle axis. In such second clamping state, torque transfer through the clamped state between the clamping rotary guide-bush collet and the clamped workpiece is typically not possible or at least only possible for small torques.

In one preferred aspect, the rotary guide-bush assembly is configured so as to pneumatically, hydraulically, electronically and/or electromagnetically switch the rotary guide-bush collet between the two clamping states.

In one preferred aspect, the rotary guide-bush assembly is configured so as to pneumatically, hydraulically, electronically and/or electromagnetically switch the rotary guide-bush collet between one or both of the two clamping states and a release state in which the elongated workpiece, which is received in the rotary guide-bush and in the workpiece spindle, is released from being clamped.

In one preferred aspect, the rotary guide-bush assembly includes a pneumatically and/or hydraulically actuated valve configured to select between two pressure levels.

In one preferred aspect, a first pressure level of the two pressure levels being selected to switch the rotary guide-bush collet to the first clamping state of the two clamping states and/or a second pressure level of the two pressure levels being selected to switch the rotary guide-bush collet to the second clamping state of the two clamping states.

In one preferred aspect, the rotary guide-bush assembly includes another pneumatically and/or hydraulically actuated valve configured to switch the rotary guide-bush collet to a release state in which the elongated workpiece, which is received in the rotary guide-bush and in the workpiece spindle, is released from being clamped.

In one preferred aspect, the torque transferring connection includes an extensible joint structure attached to the spindle assembly and the rotary guide-bush assembly, the extensible joint structure being configured to transfer driving torque during acceleration or deceleration of the spindle rotation and being further configured to elastically elongate and/or shorten in the direction of the spindle axis.

In one preferred aspect, the extensible joint structure includes plural plate-like elements connected one-by-one to each other by fixing elements according to a bellows structure.

In one preferred aspect, the torque transferring connection and in particular the clamping portion includes one or more freewheels.

In one preferred aspect, the torque transferring connection and in particular the clamping portion includes two one-directional freewheels being arranged with opposing locking directions.

In one preferred aspect, the torque transferring connection and in particular the clamping portion includes one or more bi-directional freewheels.

In one preferred aspect, the one or more freewheels are configured to clamp the elongated workpiece, which is received in the rotary guide-bush and in the workpiece spindle, when transferring driving torque applied from the spindle motor during a driven acceleration or deceleration of the rotation of the workpiece spindle through the clamped elongated workpiece.

In one preferred aspect, the one or more freewheels are arranged at a rotary guide-bush collet of the rotary guide-bush assembly at a front side of the rotary guide-bush assembly facing away from the spindle assembly.

In one preferred aspect, the one or more freewheels are arranged at a rear side of the rotary guide-bush assembly facing towards the spindle assembly.

In another aspect, there is proposed a machine tool, in particular a lathe, comprising a spindle apparatus according to at least one of the preceding aspects.

BRIEF DESCRIPTION OF THE DRAWINGS

FIGS. 5A to 5C exemplarily illustrate different views of an extensible joint as used in the second exemplary embodiment;

FIG. 9 exemplarily illustrates a schematic sectional view of another exemplary spindle apparatus having a driven rotary guide-bush according to a fifth exemplary embodiment;

FIGS. 11A to 11C exemplarily illustrate schematic sectional views of one-directional freewheel mechanisms for use in spindle apparatuses having a driven rotary guide-bush according to according to exemplary embodiments.

DETAILED DESCRIPTION OF THE DRAWINGS AND DESCRIPTION OF EXEMPLARY EMBODIMENTS

Figure 1:
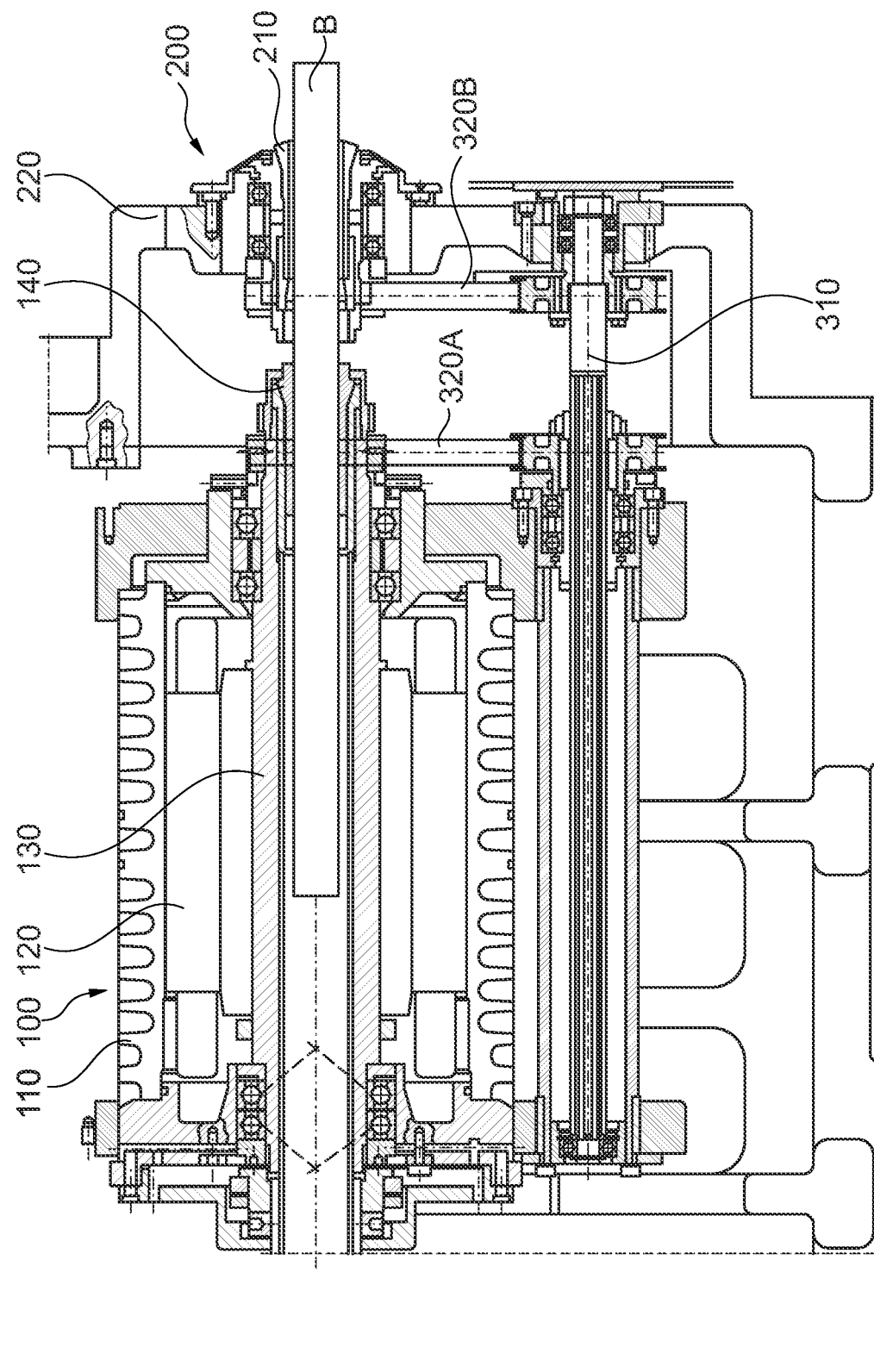
FIG. 1 exemplarily illustrates a schematic sectional view of an exemplary spindle apparatus having a driven rotary guide-bush according to a background example.

In the following, preferred aspects and embodiments will be described in more detail with reference to the accompanying figures. Same or similar features in different drawings and embodiments are referred to by similar reference numerals. It is to be understood that the detailed description below relating to various preferred aspects and preferred embodiments are not to be meant as limiting the scope of the present invention.

FIG. 1 exemplarily illustrates a schematic sectional view of an exemplary spindle apparatus having a driven rotary guide-bush according to a background example.

FIG. 1 exemplarily illustrates a spindle apparatus including a workpiece spindle 100 as may be used at a machine tool such as a lathe, e.g. a single spindle lathe, double-spindle lathe or multi-spindle lathe.

The reference numeral 600 shows a part of a machine tool, such as e.g. a lathe, and may be a machine frame or part thereof carrying/supporting a spindle assembly including a workpiece-carrying spindle.

The spindle includes a spindle housing 110 in which the spindle shaft 130 is arranged in a rotatably supported manner. Furthermore, a built-in spindle drive 120 (such as e.g. an electromagnetically driven spindle motor) is exemplarily provided for rotationally driving the spindle shaft 130 about the spindle axis within the spindle housing 110.

Exemplarily, an elongated bar B is received in the spindle 100 within a hollow portion of the spindle shaft 130 as an exemplary elongated workpiece, extending with its axial direction axially with the spindle axis.

At the front-side of the spindle 100, the spindle 100 includes a spindle collet 140 (clamping mechanism) configured to clamp the bar B, when needed, e.g. during the machining process. In the clamped state, when the spindle collet 140 clamps the bar B, the bar B is rigidly fixed to the spindle shaft 130 and rotates about the spindle axis when the spindle drive 120 rotationally drives the spindle shaft 130 about the spindle axis.

Furthermore, for being able to push/move the bar B into the axial direction of the spindle axis (hereinafter referred to as Z-direction), e.g. to move another portion of the bar B towards the machining area where the tools engage with the bar B, the spindle collet 140 can be released (e.g. by actuating the spindle collet 140 to release the bar B).

For such clamping function, to clamp and unclamp (release) the bar B, the spindle collet 140 may be actuated automatically, e.g. electronically, electromagnetically, pneumatically and/or hydraulically.

Exemplarily, in FIG. 1, the spindle apparatus further includes a rotary guide-bush assembly 200 (rotary guide-bushing), which is mounted in front of the spindle 100, in particular being arranged such that the bar B as the exemplary workpiece can extend through a rotary guide-bush collet 210 exemplarily arranged at a front side of the rotary guide-bush 200. The front side is the side facing the machining area in which the tools machine the workpiece.

In the unclamped/released state of the spindle collet 140, for being able to insert/feed a new bar B into the Z-direction into the spindle and through the rotary-guide bush, the rotary guide-bush collet 210 may have, in the unclamped/released state, a size so as to allow for a clearance between the rotary guide-bush collet 210 and the workpiece/bar B, in particular to cope with production variances of workpieces regarding workpiece diameters.

Typically such clearance may be adjusted to the diameter of the workpiece/bar B by mechanical manual adjustment of the size/diameter of a workpiece receiving portion of the rotary guide-bush collet 210. That is, such clearance is commonly adjusted to the diameter of the workpiece/bar B by mechanical manual adjustment of the size/diameter of a workpiece receiving portion of the rotary guide-bush collet 210. The reference numeral 210 denotes a rotary guide-bush collet 210 with manual clearance adjustment.

In some examples, the clearance can be manually adjusted to minimize the clearance between the rotary guide-bush collet 210 and the bar B so as to just still allow for the required Z-movability of the bar B. In other examples, an automatic clearance adjustment mechanism may be provided.

Furthermore, for being able to push/move the bar B into the Z-direction, e.g. to move another portion of the bar B towards the machining area where the tools engage with the bar B, e.g. by moving the spindle in the Z-direction with the workpiece being rigidly clamped by the spindle collet 140, the rotary guide-bush collet 210 may, in the clamped state, clamp the workpiece only loosely so as to still allow for the movement of the bar B into the Z-direction.

Exemplarily, in FIG. 1 the rotary guide-bush assembly 200 includes a mounting structure 220 for mounting the rotary guide-bush to the machine tool, e.g. to a machine frame, to a dedicated support structure, or to a spindle-carrying structure of machine tool 600.

When the bar B, as an exemplary lengthy slender workpiece, rotates about the spindle axis at about constant rotational speed, e.g. after the spindle drive 120 has driven the drive shaft 130 with the clamped bar B during an initial acceleration phase (e.g. when the spindle is ramping up), it is desired that the rotary guide-bush and specifically the collet 210 rotates at about the same rotational speed as the bar B.

Still, in order to have an option and functionality of moving the bar B in the Z-direction, e.g. when the spindle shaft 100 with the clamped workpiece (clamped via the spindle collet 140) is moved in the Z-direction, it is desired that the bar B can still move into the Z-direction in the clamped state of the rotary guide-bush collet 210.

This may be desired in particular at a spindle assembly at a machine tool having a spindle that is movable in the Z-direction (e.g. at a spindle with a sliding headstock) since this may require that the bar B is moving together with the spindle in the Z-direction with the spindle collet 140 rigidly clamping the bar B during machining operations, while the rotary guide-bush collet 210 is more loosely clamping the bar B so as to allow for Z-movement of the spindle and the workpiece clamped rigidly at the spindle collet 140.

That is, in a typical machining operation, the clamping state at the spindle collet 140 rigidly clamps the bar B so that the bar B reliably rotates about the spindle axis at the rotational speed of the spindle 100, even if cutting tools or other tools may engage at the tip of the bar B.

On the other hand, the clamping state at the rotary guide-bush collet 210 clamps the bar B more loosely so that the bar B is still allowed to move in the Z-direction through the rotary guide-bush collet 210.

During the ramp-up phase, however, when the spindle rotation is accelerated by the spindle drive 120, no or only unsubstantial torque can be transferred via the bar B from the rotationally driven spindle shaft 130 to the rotary guide-bush collet 210 due to the above-mentioned more loose clamping state of the rotary guide-bush collet 210 so that the rotation of the bar B cannot synchronize the spindle rotation with the rotation of the rotary guide-bush.

Accordingly, for the phase of acceleration of the spindle rotation and the deceleration thereof, a separate driving mechanism is provided, including a rotationally supported transfer shaft 310 which is arranged in parallel with the spindle axis next to the spindle shaft 130, and a driving belt 320A is arranged between the spindle shaft 130 and the transfer shaft 310.

When the spindle shaft 130 rotates, the rotation torque can be transmitted via the driving belt 320A so that the transfer shaft 310 accelerates, rotates and decelerates in synchronicity with the rotational speed of the spindle shaft 130 driven by the spindle drive 120.

Furthermore, another driving belt 320B is arranged between the transfer shaft 310 and a rotating sleeve of the rotary guide-bush assembly 200. Accordingly, when the transfer shaft 310 rotates, the rotation torque can be transmitted via the driving belt 320B so that the rotary guide-bush and the rotary guide-bush collet 210 accelerate, rotate and decelerate in synchronicity with the rotational speed of transfer shaft 310 driven by the spindle drive 120 by torque transfer via the transfer shaft 310.

Accordingly, by such additional driving mechanism, the rotary guide-bush and the rotary guide-bush collet 210 accelerate, rotate and decelerate in synchronicity with the rotational speed of the spindle shaft 130 and the bar B by being driven by the spindle drive 120 by torque transfer via the transfer shaft 310, and the movement of the bar B in the Z-direction through the rotary guide-bush remains possible as desired.

In this example, the spindle assembly 100 and the rotary guide-bush assembly 200 are configured to connect to each other by a torque transferring connection arranged outside of an area between the spindle assembly 100 and the rotary guide-bush assembly 200 and displaced radially with respect to the spindle axis, so as to transfer driving torque during acceleration or deceleration of the spindle rotation driven by the spindle motor to the rotary guide-bush of the rotary guide-bush assembly 200.

Such torque transferring connection includes the rotationally supported transfer shaft 310 which is arranged in parallel with the spindle axis next to the spindle shaft 130, and the driving belts 320A being arranged between the spindle shaft 130 and the transfer shaft 310 and the driving belt 320B being arranged between the transfer shaft 310 and a rotating sleeve of the rotary guide-bush assembly 200.

However, even though this background example has the benefit that the spindle drive is used to also drive the rotation of the rotary guide bush, an additional driving mechanism according to the above torque transferring connection arranged outside of an area between the spindle assembly 100 and the rotary guide-bush assembly 200 and displaced radially with respect to the spindle axis needs to be provided so that the spindle assembly cannot be provided as a cost-effective, efficient and compact mechanism.

Figure 2:
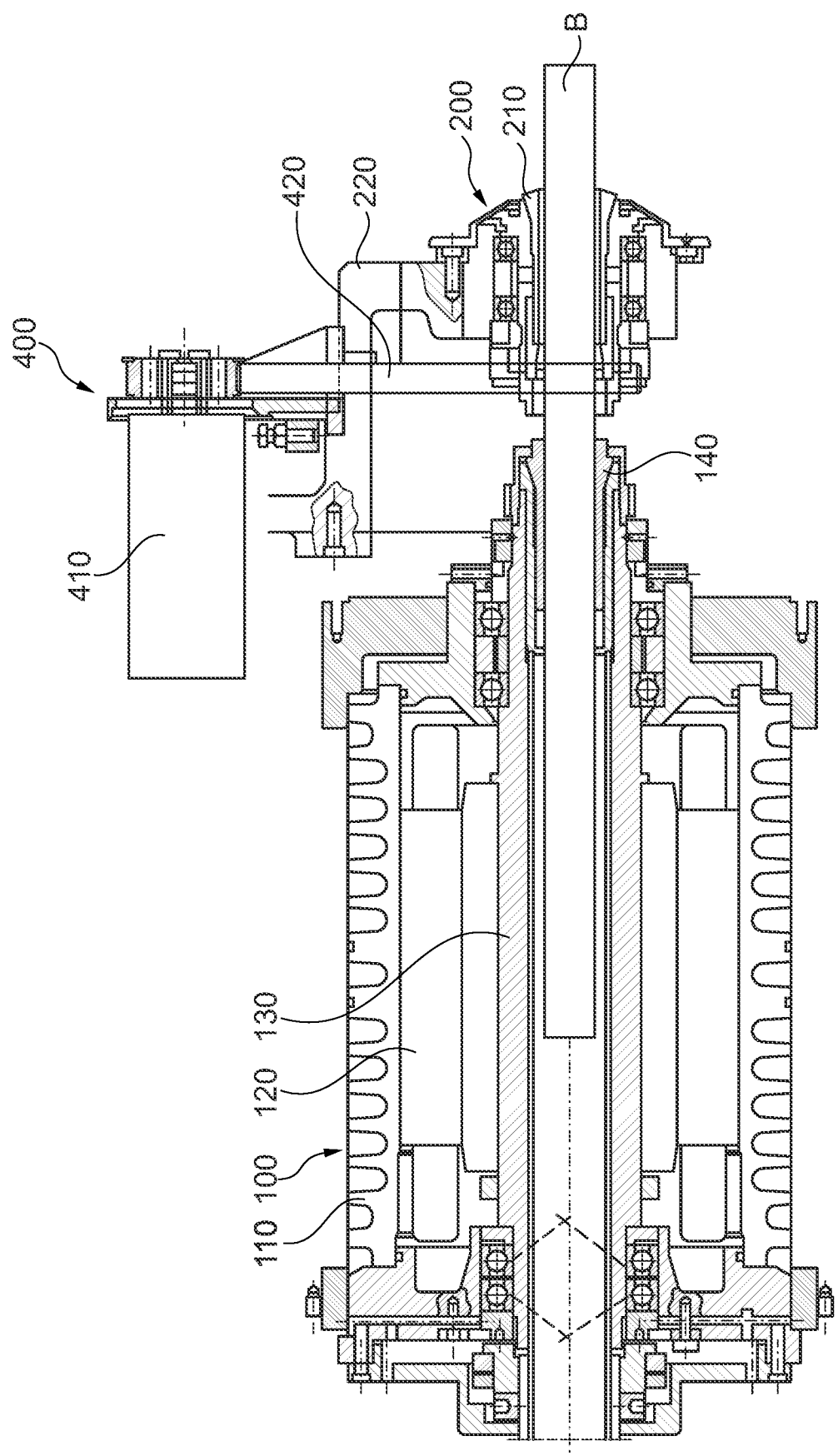
FIG. 2 exemplarily illustrates a schematic sectional view of another exemplary spindle apparatus having a driven rotary guide-bush according to a background example.

FIG. 2 exemplarily illustrates a schematic sectional view of another exemplary spindle apparatus having a driven rotary guide-bush according to a background example.

In this example, also there is provided an additional driving mechanism 400 including an external drive motor 410.

Accordingly, for the phase of acceleration of the spindle rotation and the deceleration thereof, a separate driving mechanism 400 is provided, including the external drive motor 410 and a driving belt 420 is arranged between the drive motor 410 and a rotating sleeve of the rotary guide-bush assembly 200. Accordingly, when the drive motor 410 drives the driving belt 420, the rotation torque can be transmitted via the driving belt 420 so that the rotary guide-bush and the rotary guide-bush collet 210 accelerate, rotate and decelerate by being driven by the external drive motor 410.

By driving the external drive motor 410 as a dependent slave drive of the master drive being the spindle drive 120 being synchronized e.g. by control software, the rotation torque can be transmitted via the driving belt 420 so that the rotary guide-bush and the rotary guide-bush collet 210 accelerate, rotate and decelerate in synchronicity with the rotational speed of the spindle shaft 130 and the bar B.

Accordingly, by such additional driving mechanism 400, the rotary guide-bush and the rotary guide-bush collet 210 accelerate, rotate and decelerate in synchronicity with the rotational speed of the spindle shaft 130 and the bar B by being driven by the synchronously controlled external drive motor 410 via the driving belt 420, and the movement of the bar B in the Z-direction through the rotary guide-bush remains possible as desired.

However, in this example, the spindle assembly 100 and the rotary guide-bush assembly 200 are not connected to each other by a torque transferring connection, and an additional driving mechanism 400 with an additional external drive motor 410, which is required to be synchronized with the spindle drive, needs to be provided so that the spindle assembly cannot be provided as a cost-effective, efficient and compact mechanism.

Figure 3:
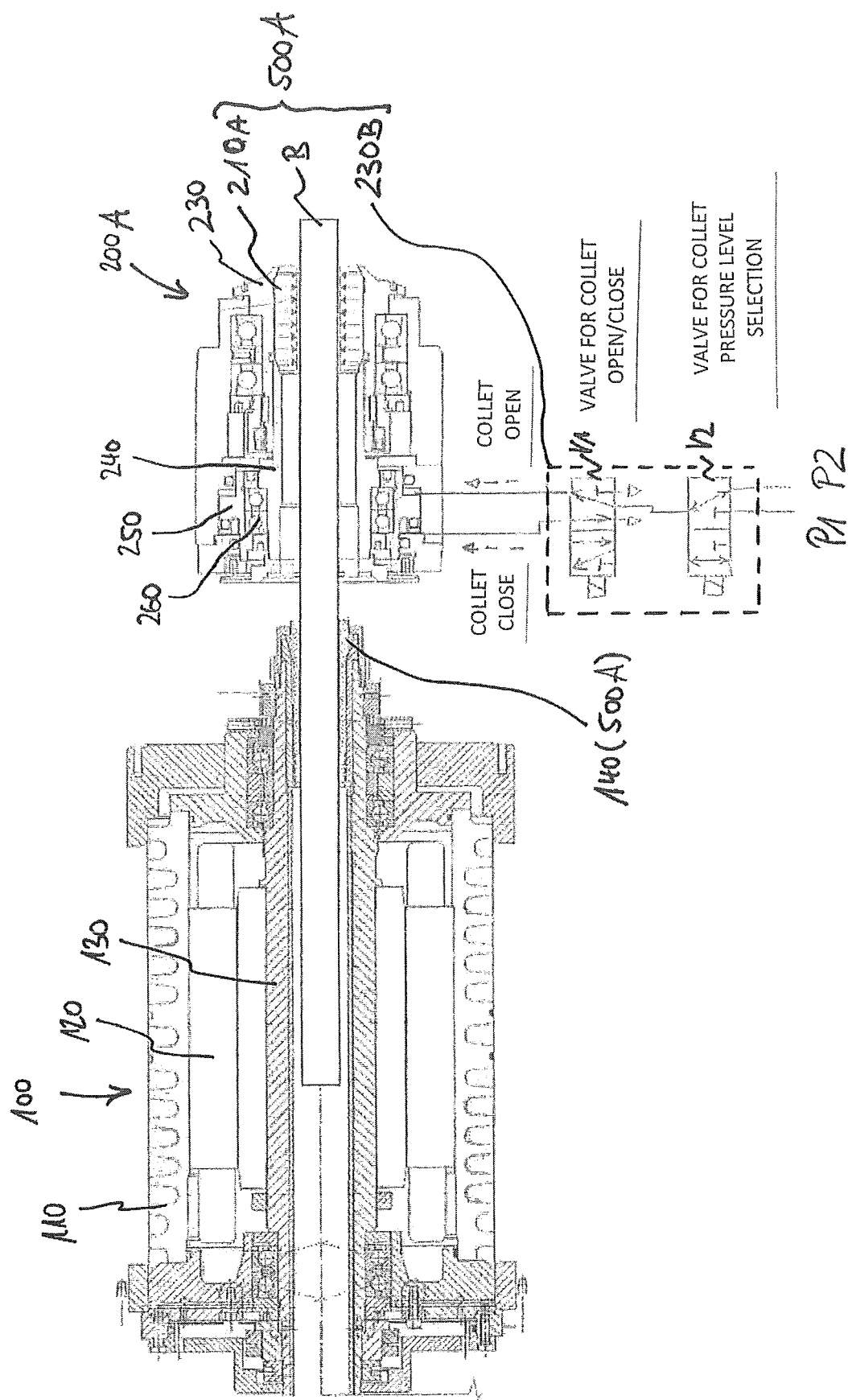
FIG. 3 exemplarily illustrates a schematic sectional view of another exemplary spindle apparatus having a driven rotary guide-bush according to a first exemplary embodiment.

FIG. 3 exemplarily illustrates a schematic sectional view of another exemplary spindle apparatus having a driven rotary guide-bush according to a first exemplary embodiment.

Exemplarily, the spindle apparatus with spindle assembly 100 again includes the spindle housing 110, the built-in spindle drive 120 and the rotationally supported spindle shaft 130, and a spindle collet 140 arranged at a front portion of the spindle for clamping the workpiece, such as e.g. the bar B, received at the spindle.

Similar as in FIGS. 1 and 2 above, for being able to push/move the bar B into the axial direction of the spindle axis (hereinafter referred to as Z-direction), e.g. to move another portion of the bar B towards the machining area where the tools engage with the bar B, the spindle collet 140 can be released (e.g. by actuating the spindle collet 140 to release the bar B).

For such clamping function, to clamp and unclamp (release) the bar B, the spindle collet 140 may be actuated automatically, e.g. electronically, electromagnetically, pneumatically and/or hydraulically.

In front of the spindle, there is provided the axially arranged rotary guide-bush assembly 200A which may be attached by a mounting structure (not shown in FIG. 3) for mounting the rotary guide-bush to the machine tool, e.g. to a machine frame, to a dedicated support structure, or to a spindle-carrying structure, of a machine tool 600, similar to FIG. 1.

The rotary guide-bush assembly 200A exemplarily includes the rotary guide-bush collet 210A exemplarily arranged at a front portion of the rotary guide-bush assembly 200A. The rotary guide-bush collet 210A is exemplarily arranged inside flange 230.

In contrast to the rotary guide-bush assembly 200 with the rotary guide-bush collet 210 with manual clearance adjustment, the rotary guide-bush assembly 200A exemplarily includes the rotary guide-bush collet 210A with automatic clearance adjustment. That is, the reference numeral 210A denotes a rotary guide-bush collet 210A with automatic clearance adjustment.

Furthermore, the rotary guide-bush assembly 200A exemplarily includes a sleeve 240 which is rotationally supported by bearings in a rotary guide-bush housing of the rotary guide-bush assembly 200A together with the rotationally supported rotary guide-bush collet 210A and flange 230.

Exemplarily, in FIG. 3, the spindle apparatus further includes the rotary guide-bush assembly 200A (rotary guide-bushing), which is mounted in front of the spindle 100, in particular being arranged such that the bar B as the exemplary workpiece can extend through the rotary guide-bush collet 210A exemplarily arranged at the front side of the rotary guide-bush 200.

Furthermore, for being able to push/move the bar B into the Z-direction, e.g. to move another portion of the bar B towards the machining area where the tools engage with the bar B, e.g. by also unclamping the bar B at the spindle collet 140, the rotary guide-bush collet 210A can be released (e.g. by actuating the rotary guide-bush collet 210A to release the bar B).

For such clamping function, to clamp and unclamp (release) the bar B, the rotary guide-bush collet 210A may be actuated automatically, e.g. electronically, electromagnetically, pneumatically and/or hydraulically.

In the exemplary embodiment of FIG. 3, the rotary guide-bush collet 210A is exemplarily actuated by pneumatic or hydraulic control, and the rotary guide-bush assembly 200 includes a piston 250 and piston bearings 260.

A chamber of the piston 250 is exemplarily connected on both sides of the piston 250 with pressure channels being connected to a first valve V1 of a collet-control valve section 230B.

Preferably, the first valve V1 can be actuated by electronic or electromagnetic control. The first valve V1 is exemplarily connected to a second valve V2 of the collet-control valve section 230B which is connected to two different pressure levels P1 and P2. Preferably, the second valve V2 can be actuated by electronic or electromagnetic control.

The second valve V2 is exemplarily configured for pressure selection between the two different pressure levels P1 and P2 with P1 being preferably high pressure and P2 being preferably low pressure (e.g. P2<P1).

The first valve V1 is exemplarily configured for applying the pressure level selected by the second valve V2 to either side of the piston 250 so as to actuate either opening of the rotary guide-bush collet 210A to release the bar B or to actuate closing of the rotary guide-bush collet 210A to clamp the bar B.

Depending on the selected pressure level, the clamping state of the rotary guide-bush collet 210A either clamps the bar B (workpiece) more loosely (to allow for movement of the workpiece in the Z-direction, but with limited or no torque transfer) or rigidly (to allow for torque transfer).

Accordingly, if the valve V2 is actuated to select the high pressure level P1, and the valve V1 actuates to close the rotary guide-bush collet 210A by applying the high pressure level P1 to the piston 250, the bar B is rigidly clamped by the rotary guide-bush collet 210A (to allow for torque transfer).

However, if the valve V2 is actuated to select the low pressure level P2, and the valve V1 actuates to close the rotary guide-bush collet 210A by applying the low pressure level P2 to the piston 250, the bar B is clamped by the rotary guide-bush collet 210A more loosely (to allow for movement of the workpiece in the Z-direction, but with limited or no torque transfer).

For automatic clearance adjustment, a third lowest level pressure level can be adjusted to achieve the appropriate clearance depending on the size/diameter of the workpiece when the rotary guide-bush collet 210A is in the unclamped/released state instead of any of the first or second clamping states. This has the advantage that the clearance in the released state of the rotary guide-bush collet 210A can be automatically adjusted even between machining different workpieces which might have minor variations in size due to production variations.

As a result of the pressure selection between pressure levels P1 and P2 above, the actuation mechanism of the rotary guide-bush collet 210A is configured to allow for two different clamping states, namely a first clamping state in which the bar B (workpiece) is rigidly clamped by the rotary guide-bush collet 210A and a second clamping state in which the bar B (workpiece) is more loosely clamped by the rotary guide-bush collet 210A.

Accordingly, for accelerating (or decelerating) the spindle rotation, the spindle collet 140 is actuated to rigidly clamp the workpiece (such as bar B) and the rotary guide-bush collet 210A of the rotary guide-bush assembly 200A is actuated by the first clamping state in which the bar B (workpiece) is rigidly clamped by the rotary guide-bush collet 210A to allow for torque transfer, e.g. in that the valve V2 is actuated to select the high pressure level P1, and the valve V1 actuates to close the rotary guide-bush collet 210A by applying the high pressure level to the piston 250, so that the bar B is rigidly clamped by the rotary guide-bush collet 210A.

Then, during the ramp-up phase, when the spindle rotation is accelerated by the spindle drive 120, the driving torque can be transferred directly via the bar B from the rotationally driven spindle shaft 130 to the rotary guide-bush collet 210A so that the rotation of the bar B (workpiece) can be used to synchronize the spindle rotation with the rotation of the rotary guide-bush during acceleration or deceleration of the spindle rotation.

During such phase, the workpiece cannot be moved in the Z-direction, but this is typically not required during the acceleration/deceleration of the spindle since the tools typically do not engage with the workpiece during this phase and no machining operations are performed.

Once the target rotational speed of the spindle for the machining operations is achieved, when the spindle shaft 130, the bar B and the rotary guide-bush rotate in synchronicity at a substantially constant rotational speed, the second valve V2 can be actuated to select the low pressure level P2, and the valve V1 then actuates to close the rotary guide-bush collet 210A by applying the low pressure level P2 to the piston 250, so that the bar B is more loosely clamped by the rotary guide-bush collet 210A to allow for Z-movement of the workpiece.

Accordingly, when the bar B, as an exemplary lengthy slender workpiece, rotates about the spindle axis at about constant rotational speed, e.g. after the spindle drive 120 has driven the drive shaft 130 with the clamped bar B during an initial acceleration phase (e.g. when the spindle is ramping up), the rotary guide-bush and specifically the collet 210A rotates at about the same rotational speed as the bar B and still the bar B can advantageously move together with the spindle in the Z-direction with the spindle collet 140 still rigidly clamping the bar B during machining operations, while the rotary guide-bush collet 210A is clamping the bar B more loosely.

That is, in a typical machining operation, the clamping state at the spindle collet 140 rigidly clamps the bar B so that the bar B reliably rotates about the spindle axis at the rotational speed of the spindle 100, even if cutting tools or other tools may engage at the tip of the bar B.

On the other hand, the clamping state at the rotary guide-bush collet 210A clamps the bar B more loosely so that the bar B is still allowed to move in the Z-direction through the rotary guide-bush collet 210A.

Once, a working speed of the spindle rotation needs to be changed by acceleration of deceleration, the second valve V2 can be actuated again to select the high pressure level P1, and the valve V1 then actuates to close the rotary guide-bush collet 210A by applying the high pressure level to the piston 250, so that the bar B is rigidly clamped by the rotary guide-bush collet 210A to allow for torque transfer.

Then again, when the spindle rotation is accelerated by the spindle drive 120, the driving torque can be transferred directly via the bar B from the rotationally driven spindle shaft 130 to the rotary guide-bush collet 210A so that the rotation of the bar B (workpiece) can be used to synchronize the spindle rotation with the rotation of the rotary guide-bush during acceleration or deceleration of the spindle rotation.

During such phase, the workpiece cannot be moved in the Z-direction, but this is typically not required during the acceleration/deceleration of the spindle since the tools typically do not engage with the workpiece during this phase and no machining operations are performed.

In this exemplary embodiment, the spindle assembly 100 and the rotary guide-bush assembly 200 are configured to connect to each other, in particular during a phase of acceleration or deceleration of the spindle rotation, by a torque transferring connection 500A arranged between the spindle assembly 100 and the rotary guide-bush assembly 200 along the spindle axis so as to transfer driving torque during acceleration or deceleration of the spindle rotation driven by the spindle motor to the rotary guide-bush of the rotary guide-bush assembly 200, in particular through the torque transferring connection 500A and specifically through the workpiece/bar B.

Exemplarily, in FIG. 3, the torque transferring connection 500A includes the spindle collet 140, the bar B, and the rotary guide-bush collet 210A.

In the configuration of FIG. 3, an additional driving mechanism as in FIGS. 1 and 2 does not need to be provided so that the spindle assembly can advantageously be provided as a cost-effective, efficient and compact mechanism.

It is noted that the further exemplary embodiments relate to further aspects that may be used alone or in combination with the above aspect of FIG. 3, wherein such aspects are not described below anymore.

Figure 4:
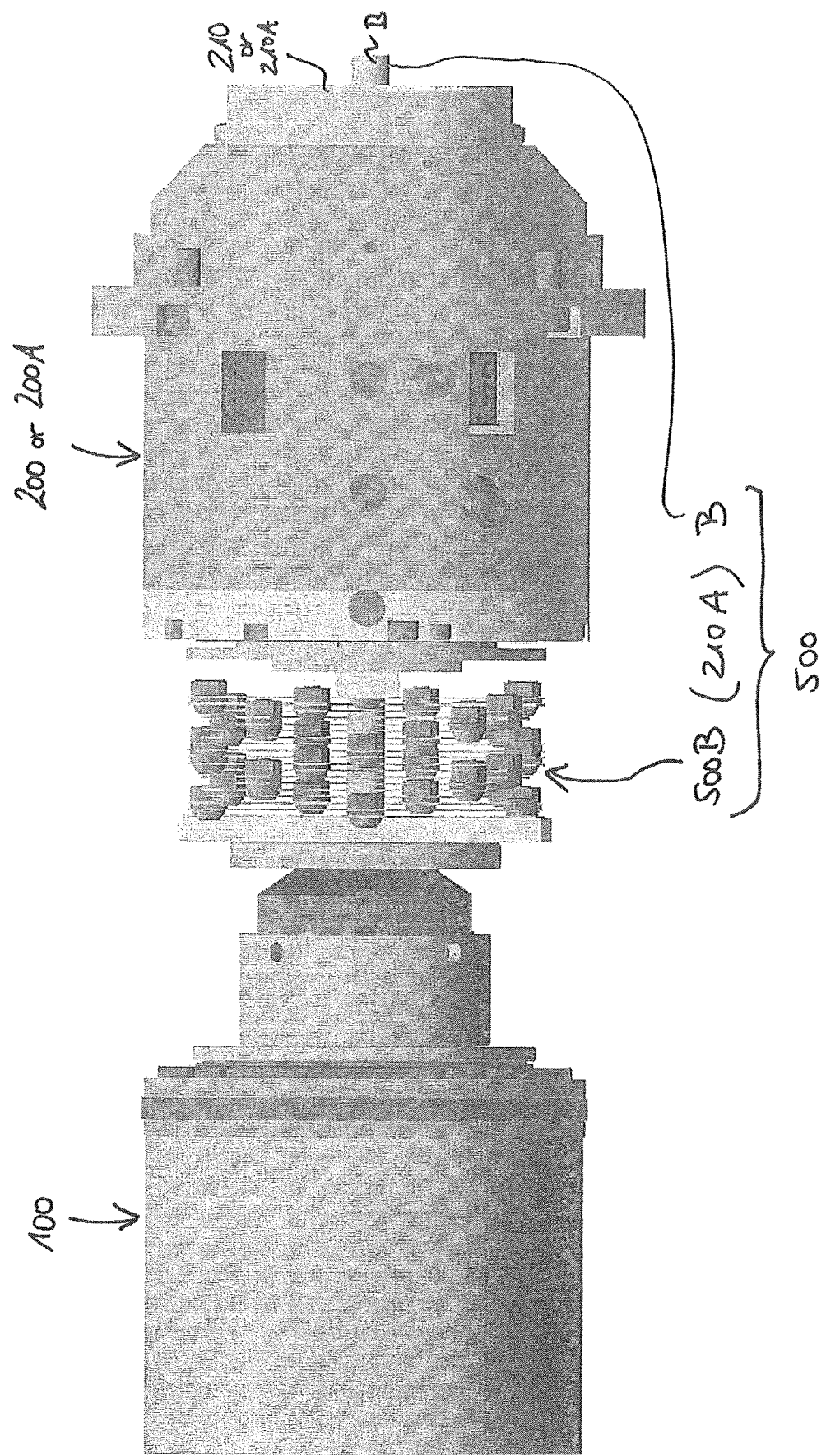
FIG. 4 exemplarily illustrates a schematic view of another exemplary spindle apparatus having a driven rotary guide-bush according to a second exemplary embodiment.

FIG. 4 exemplarily illustrates a schematic sectional view of another exemplary spindle apparatus having a driven rotary guide-bush according to a second exemplary embodiment.

FIG. 4 exemplarily shows the spindle 100 and the rotary guide-bush 200 or 200A similarly arranged as in above exemplary embodiments and relate figures. Specifically, this exemplary embodiment may be realized by using a rotary guide-bush 200 having a rotary guide-bush collet 210 with manual clearance adjustment or it may be realized by a using a rotary guide-bush 200A having a rotary guide-bush collet 210A with automatic clearance adjustment. Also, it is to be noted that this exemplary embodiment can be combined with any of the above or below exemplary embodiments.

In between the spindle 100 and the rotary guide-bush 200A (or 200), there is provided an extensible joint structure 500B being attached with one end to a front side of the spindle 100 and with the other end to a rear side of the rotary guide-bush assembly 200A (or 200).

The extensible joint structure 500B joins the spindle 100 and the rotary guide-bush 200A (or 200) so as to transfer torque during rotation about the spindle axis, but the extensible joint structure 500B is configured to extend in length in the Z-direction so as to allow for movement of the spindle 100 in the Z-direction with the rotary guide-bush 200A (or 200) remaining stationary in Z-position.

Accordingly, the extensible joint structure 500B is configured to elongate/shorten (preferably elastically) while the spindle 100 slides in the Z-direction.

FIGS. 5A to 5C exemplarily illustrate different views of an extensible joint as used in the sixth exemplary embodiment.

The extensible joint structure 500B is exemplarily realized through several elements 501 of different possible shape and material connected one-by-one to each other by fixing elements 503, such as e.g. screws or bolts, in order to realize a "bellows" structure solution (in the longitudinal direction), warranting high torsional stiffness for transmitting torque from spindle 100 (master) to the rotary guide-bush 200A or 200 (slave).

Each of the elements 501 has a center hole 502 so that the center holes 502 are arranged axially in the spindle axis direction (Z-axis) so as to allow the bar B (workpiece) to extend through the center holes 502 from the spindle 100 to the rotary guide-bush 200A (or 200).

Exemplarily, the elements 501 are substantially cross-shaped viewed in the Z-direction and are plate-like viewed perpendicular to the Z-direction, exemplarily having different cross angles such that one of the cross-portions of a certain element 501 can be attached to another element 501 on one side and the other one of the cross-portions can be attached to another element 501 on the other side, the elements 501 being arranged in a stacked arrangement in the Z-direction.

In this exemplary embodiment, the spindle assembly 100 and the rotary guide-bush assembly 200 are configured to connect to each other, at all times, by a torque transferring connection realized by the extensible joint structure 500B arranged between the spindle assembly 100 and the rotary guide-bush assembly 200 along the spindle axis so as to transfer driving torque during acceleration or deceleration of the spindle rotation driven by the spindle motor to the rotary guide-bush of the rotary guide-bush assembly 200, in particular through the torque transferring connection realized by the extensible joint structure 500B and specifically through the extensible joint structure 500B.

Exemplarily, in FIG. 4, the torque transferring connection may include the extensible joint structure 500B as single torque transferring connection, specifically if the rotary guide-bush 200 having a rotary guide-bush collet 210 with manual clearance adjustment is used.

On the other hand, if the rotary guide-bush 200A having a rotary guide-bush collet 210A such as described above is used, exemplarily, spindle assembly 100 and the rotary guide-bush assembly 200A are configured to connect to each other by a torque transferring connection 500 arranged between the spindle assembly 100 and the rotary guide-bush assembly 200A along the spindle axis so as to transfer driving torque during acceleration or deceleration of the spindle rotation driven by the spindle motor to the rotary guide-bush of the rotary guide-bush assembly 200A, in particular through the torque transferring connection 500 including through the workpiece/bar B.

Exemplarily, in FIG. 4, if the rotary guide-bush 200 having a rotary guide-bush collet 210 with manual clearance adjustment is used such as in FIGS. 1 and 2, the torque transferring connection is realized by the extensible joint structure 500B, whereas, if the rotary guide-bush 200A having a rotary guide-bush collet 210A is used such as in FIG. 3, the torque transferring connection 500 includes, in addition to the extensible joint structure 500B and in particular during a phase of acceleration or deceleration of the spindle rotation, the spindle collet 140, the bar B, and the rotary guide-bush collet 210A.

That is, in FIG. 4, if the rotary guide-bush 200A having a rotary guide-bush collet 210A is used such as in FIG. 3, the spindle assembly 100 and the rotary guide-bush assembly 200A are configured to connect to each other, in particular during a phase of acceleration or deceleration of the spindle rotation, by a torque transferring connection 500 arranged between the spindle assembly 100 and the rotary guide-bush assembly 200A along the spindle axis so as to transfer driving torque during acceleration or deceleration of the spindle rotation driven by the spindle motor to the rotary guide-bush of the rotary guide-bush assembly 200A, in particular through the torque transferring connection 500 and specifically through the workpiece/bar B and the extensible joint structure 500B.

It is noted that such extensible joint structure 500 can optionally also be added not only to the configuration of FIG. 3 but optionally also to all of the below described exemplary embodiments.

In any case, in the configuration of FIG. 4, an additional driving mechanism as in FIGS. 1 and 2 does not need to be provided so that the spindle assembly can advantageously be provided as a cost-effective, efficient and compact mechanism.

Figure 6:
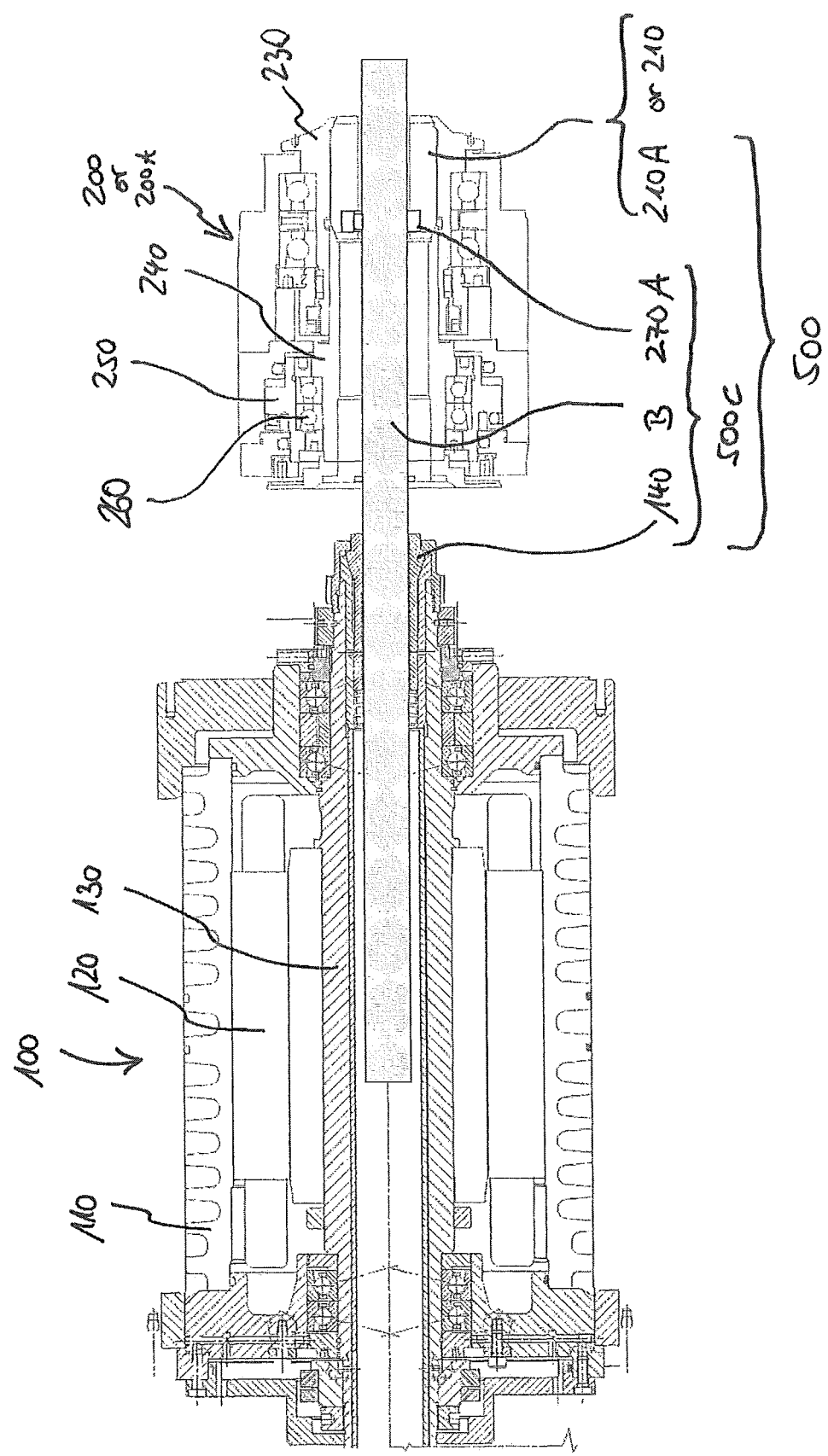
FIG. 6 exemplarily illustrates a schematic sectional view of another exemplary spindle apparatus having a driven rotary guide-bush according to a third exemplary embodiment.

FIG. 6 exemplarily illustrates a schematic sectional view of another exemplary spindle apparatus having a driven rotary guide-bush according to a third exemplary embodiment.

Exemplarily, the spindle apparatus 100 again includes the spindle housing 110, the built-in spindle drive 120 and the rotationally supported spindle shaft 130, and a spindle collet 140 arranged at a front portion of the spindle for clamping the workpiece, such as e.g. the bar B, received at the spindle.

Similar as in FIGS. 1, 2 and 3 above, for being able to push/move the bar B into the axial direction of the spindle axis (hereinafter referred to as Z-direction), e.g. to move another portion of the bar B towards the machining area where the tools engage with the bar B, the spindle collet 140 can be released.

For such clamping function, to clamp and unclamp the bar B, the spindle collet 140 may be actuated automatically, e.g. electronically, electromagnetically, pneumatically and/or hydraulically.

In front of the spindle, there is provided the axially arranged rotary guide-bush assembly 200 or 200A, e.g. as described above, which may be attached by a mounting structure (not shown in FIG. 4) for mounting the rotary guide-bush to the machine tool 600, e.g. to a machine frame, to a dedicated support structure, or to a spindle-carrying structure, similar to FIG. 1.

The rotary guide-bush assembly 200 or 200A exemplarily includes the rotary guide-bush collet 210 or 210A (e.g. as described above) exemplarily arranged at a front portion of the rotary guide-bush assembly 200 or 210A. The rotary guide-bush collet 210 or 210A is exemplarily arranged inside flange 230.

Furthermore, the rotary guide-bush assembly 200 or 200A exemplarily includes a sleeve 240 which is rotationally supported by bearings in a rotary guide-bush housing of the rotary guide-bush assembly 200 or 200A together with the rotationally supported rotary guide-bush collet 210 or 210A and flange 230.

Exemplarily, in FIG. 6, the rotary guide-bush assembly 200 or 200A (rotary guide-bushing), is being arranged such that the bar B as the exemplary workpiece can extend through the rotary guide-bush collet 210 or 210A exemplarily arranged at the front side of the rotary guide-bush 200 or 200A.

At the position of the rotary guide-bush collet 210 or 210A, the rotary guide-bush assembly 200 or 200A of FIG. 6 further exemplarily includes a freewheel assembly 270A.

Such freewheel assembly can be configured one-directional in some exemplary embodiments, however, if only one freewheel assembly is exemplarily used, it is preferably realized as a bi-directional freewheel.

As for example known from bicycles, a one-directional freewheel is a mechanism in a transmission that disengages a driveshaft (e.g. the bar B/workpiece) from the driven element (e.g. the rotary guide-bush or in particular rotary guide-bush collet 210 or 210A) when the driven element rotates at about equal rotational speed (with substantially no torque being transmitted) or faster than the driveshaft, and that engages the driveshaft (e.g. the bar B/workpiece) with the driven element (e.g. the rotary guide-bush or in particular rotary guide-bush collet 210 or 210A) when the driven element rotates at about equal rotational speed (with torque being transmitted) compared to the driveshaft.

A one-directional freewheel typically has a locking direction (or driving operation direction) and a freewheeling direction (or freewheeling operation direction). For example, if a one-directional freewheel has a clockwise locking direction, it has a counter-clockwise freewheeling direction, and vice versa.

On the other hand, a two-directional (or bi-directional) freewheel is a mechanism in a transmission that disengages a driveshaft (e.g. the bar B/workpiece) from the driven element (e.g. the rotary guide-bush or in particular rotary guide-bush collet 210 or 210A) when the driven element rotates at about equal rotational speed with substantially no torque being transmitted, and that engages the driveshaft (e.g. the bar B/workpiece) with the driven element (e.g. the rotary guide-bush or in particular rotary guide-bush collet 210 or 210A) when the driven element rotates at about equal rotational speed with torque being transmitted.

A simple two-directional (or bi-directional) freewheel assembly can be provided by providing two one-directional freewheels at opposite locking direction orientations.

As can be exemplarily seen in FIG. 6, the bar B as the exemplary workpiece can extend through the rotary guide-bush collet 210 or 210A and through the freewheel 270A, and the freewheel 270A is arranged to either lock/engage with the bar B or freewheel/disengage with the bar B.

During the ramp-up phase, when the spindle rotation is accelerated by the spindle drive 120 (in accordance with the locking direction of the freewheel 270A if freewheel 270A is one-directional), the driving torque can be transferred directly via the bar B from the rotationally driven spindle shaft 130 to the rotary guide-bush collet 210 of 210A since the occurrence of driving torque locks/engages the bar B with the freewheel 270A.

Accordingly, the rotation of the bar B (workpiece) can be used to synchronize the spindle rotation with the rotation of the rotary guide-bush during acceleration and/or deceleration of the spindle rotation.

It is to be noted that, if only one single one-directional freewheel is used, the synchronization can only be achieved during either acceleration or deceleration, however, for two-directional (or bi-directional) freewheels, the synchronization can be achieved for both acceleration and deceleration of the spindle, and thus using a two-directional (or bi-directional) freewheel 270A in the configuration of FIG. 6 is preferred.

During such speed changing phase, the workpiece cannot be moved in the Z-direction, but this is typically not required during the acceleration/deceleration of the spindle since the tools typically do not engage with the workpiece during this phase and no machining operations are performed.

Once the target rotational speed of the spindle for the machining operations is achieved, when the spindle shaft 130, the bar B and the rotary guide-bush rotate in synchronicity at a substantially constant rotational speed, substantially no torque is applied and the freewheel 270A releases the locked/engaged state.

Accordingly, when the bar B, as an exemplary lengthy slender workpiece, rotates about the spindle axis at about constant rotational speed, e.g. after the spindle drive 120 has driven the drive shaft 130 with the clamped bar B during an initial acceleration phase (e.g. when the spindle is ramping up), the rotary guide-bush and specifically the collet 210 or 210A rotates at about the same rotational speed as the bar B and still the bar B can advantageously move together with the spindle in the Z-direction with the spindle collet 140 still rigidly clamping the bar B during machining operations, while the rotary guide-bush collet 210 or 210A is clamping the bar B loosely and the freewheel 270A does not lock the bar B.

That is, in a typical machining operation, the clamping state at the spindle collet 140 rigidly clamps the bar B so that the bar B reliably rotates about the spindle axis at the rotational speed of the spindle 100, even if cutting tools or other tools may engage at the tip of the bar B.

On the other hand, the clamping state at the rotary guide-bush collet 210 or 210A clamps the bar B rather loosely so that the bar B is still allowed to move in the Z-direction through the rotary guide-bush collet 210 or 210A.

In this exemplary embodiment, the spindle assembly 100 and the rotary guide-bush assembly 200 or 200A are configured to connect to each other, in particular during a phase of acceleration or deceleration of the spindle rotation, by a torque transferring connection 500C or 500 arranged between the spindle assembly 100 and the rotary guide-bush assembly 200 or 200A along the spindle axis so as to transfer driving torque during acceleration or deceleration of the spindle rotation driven by the spindle motor to the rotary guide-bush of the rotary guide-bush assembly 200 or 200A, in particular through the torque transferring connection 500C or 500 and specifically through the workpiece/bar B.

Exemplarily, in FIG. 6, if the rotary guide-bush 200 having a rotary guide-bush collet 210 with manual clearance adjustment is used such as in FIGS. 1 and 2, the torque transferring connection 500C includes or is realized by the spindle collet 140, the bar B and the freewheel 270A. On the other hand, if the rotary guide-bush 200A having a rotary guide-bush collet 210A is used such as in FIG. 3, the torque transferring connection 500 includes, in addition to the torque transferring connection 500C including or being realized by the spindle collet 140, the bar B and the freewheel 270A, the rotary guide-bush collet 210A which can be switched to rigidly clamp the bar B.

Further, if an extensible joint structure 500B such as exemplarily described in connection with FIG. 4 is used, the overall torque transferring connection would include or be realized by the torque transferring connection 500C or 500, depending on whether the rotary guide-bush collet 210 or 210A is used, and the extensible joint structure 500B.

In any case, in the configuration of FIG. 6, an additional driving mechanism as in FIGS. 1 and 2 does not need to be provided so that the spindle assembly can advantageously be provided as a cost-effective, efficient and compact mechanism.

Figure 7:
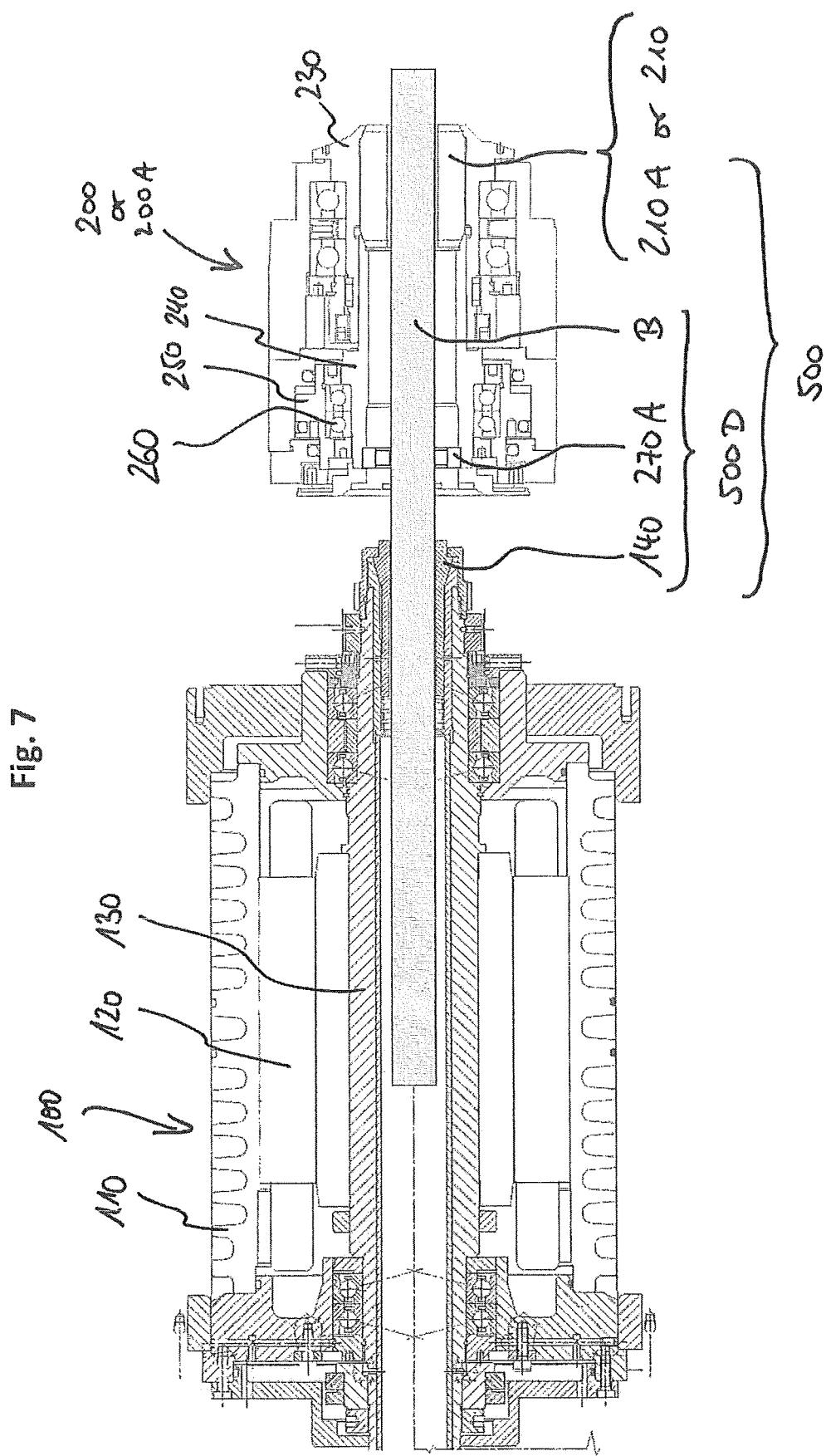
FIG. 7 exemplarily illustrates a schematic sectional view of another exemplary spindle apparatus having a driven rotary guide-bush according to a fourth exemplary embodiment.

FIG. 7 exemplarily illustrates a schematic sectional view of another exemplary spindle apparatus having a driven rotary guide-bush according to a fourth exemplary embodiment.

The exemplary embodiment of FIG. 7 is similar to FIG. 6 with the difference that a freewheel mechanism 270A is arranged on an opposite side of the rotary guide-bush assembly compared to the rotary guide-bush collet 210 or 210A.

Specifically, the freewheel mechanism 270A is exemplarily provided on a side of the rotary guide-bush assembly facing the workpiece spindle (i.e. at the rear side of the rotary guide-bush assembly). This has the advantage that the distance between the freewheel 270A and the spindle collet 140 can be reduced, and such aspect may limit the critical length of the bar B for torque transmission during acceleration of the spindle, and more slender bars B can still be used to transfer torque during acceleration of the spindle for synchronously driving the rotation of the rotary guide-bush.

In this exemplary embodiment, the spindle assembly 100 and the rotary guide-bush assembly 200 or 200A are configured to connect to each other, in particular during a phase of acceleration or deceleration of the spindle rotation, by a torque transferring connection 500D or 500 arranged between the spindle assembly 100 and the rotary guide-bush assembly 200 or 200A along the spindle axis so as to transfer driving torque during acceleration or deceleration of the spindle rotation driven by the spindle motor to the rotary guide-bush of the rotary guide-bush assembly 200 or 200A, in particular through the torque transferring connection 500D or 500 and specifically through the workpiece/bar B.

Exemplarily, in FIG. 7, if the rotary guide-bush 200 having a rotary guide-bush collet 210 with manual clearance adjustment is used such as in FIGS. 1 and 2, the torque transferring connection 500D includes or is realized by the spindle collet 140, the bar B and the freewheel 270A. On the other hand, if the rotary guide-bush 200A having a rotary guide-bush collet 210A is used such as in FIG. 3, the torque transferring connection 500 includes, in addition to the torque transferring connection 500D including or being realized by the spindle collet 140, the bar B and the freewheel 270A, the rotary guide-bush collet 210A which can be switched to rigidly clamp the bar B.

Further, if an extensible joint structure 500B such as exemplarily described in connection with FIG. 4 is used, the overall torque transferring connection would include or be realized by the torque transferring connection 500D or 500, depending on whether the rotary guide-bush collet 210 or 210A is used, and the extensible joint structure 500B.

In any case, in the configuration of FIG. 7, an additional driving mechanism as in FIGS. 1 and 2 does not need to be provided so that the spindle assembly can advantageously be provided as a cost-effective, efficient and compact mechanism.

As mentioned above, in the case of a single freewheel such as e.g. in FIGS. 6 and 7, the freewheel is preferably realized as a bi-directional freewheel.

Figure 8B:
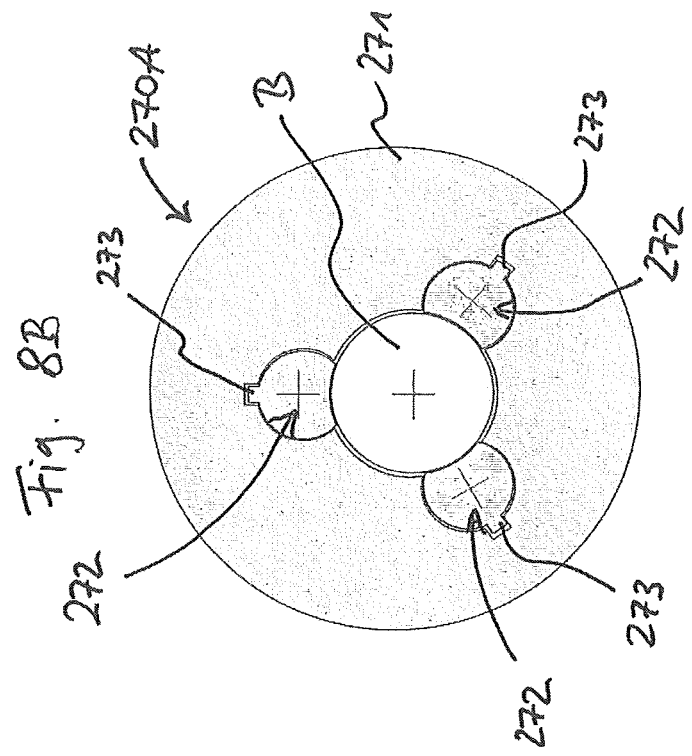
FIGS. 8A and 8B exemplarily illustrate schematic sectional views of bi-directional freewheel mechanisms for use in spindle apparatuses having a driven rotary guide-bush according to according to exemplary embodiments.
Figure 8A:
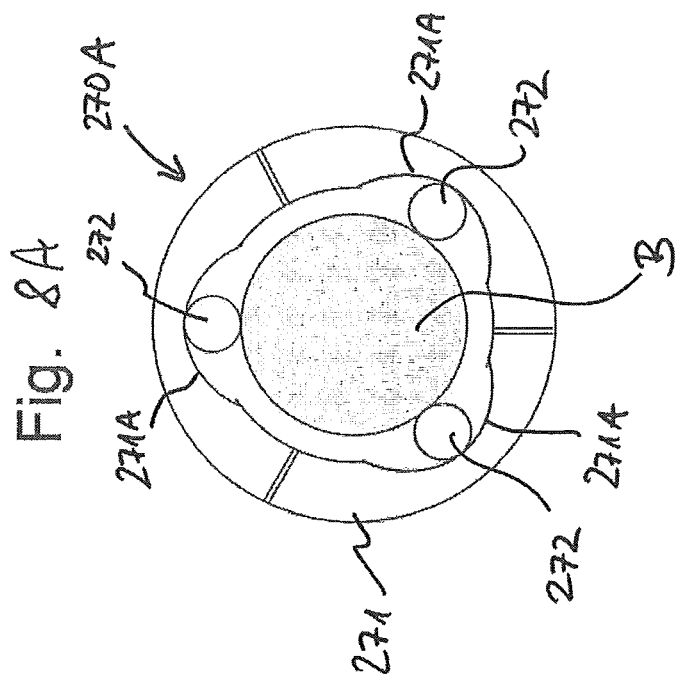

FIGS. 8A and 8B exemplarily illustrate schematic sectional views of bi-directional freewheel mechanisms 270A for use in spindle apparatuses having a driven rotary guide-bush according to according to exemplary embodiments.

The exemplary freewheel 270A in FIG. 8A is a two-directional (or bi-directional) freewheel exemplarily including an outer ring 271 and a plurality of spherical clamping elements 272 arranged around the inner circumference of the outer ring 271 inside respective symmetrical wider grooves 271A of the outer ring 271 allowing slight tangential movement of the spherical clamping elements 272 and becoming narrower in both symmetrical direction tangentially from the center of each groove 271A.

The exemplary freewheel 270A in FIG. 8B is a two-directional (or bi-directional) freewheel exemplarily including an outer ring 271 and a plurality of clamping elements 272 arranged around the inner circumference of the outer ring 271 inside respective receiving holes of the outer ring 271 and being pushed radially inwards by pushing elements 273 (such as e.g. springs or rubber elements). The clamping elements 272 exemplarily have circular cross-sectional bottom portions facing the bar B extending axially through the outer ring 271, and a diameter of the circular cross-sectional bottom portions being larger than a diameter of the bar B.

FIG. 9 exemplarily illustrates a schematic sectional view of another exemplary spindle apparatus having a driven rotary guide-bush according to a fifth exemplary embodiment.

The exemplary embodiment of FIG. 9 is similar to FIG. 6 with the difference that two freewheel mechanisms 270B1 and 270B2 arranged on opposing ends of the rotary guide-bush collet 210 or 210A are provided. For example, two one-directional freewheels may be provided being preferably arranged in opposing locking directions, or two bi-directional freewheels may be preferably provided.

In this exemplary embodiment, the spindle assembly 100 and the rotary guide-bush assembly 200 or 200A are configured to connect to each other, in particular during a phase of acceleration or deceleration of the spindle rotation, by a torque transferring connection 500E or 500 arranged between the spindle assembly 100 and the rotary guide-bush assembly 200 or 200A along the spindle axis so as to transfer driving torque during acceleration or deceleration of the spindle rotation driven by the spindle motor to the rotary guide-bush of the rotary guide-bush assembly 200 or 200A, in particular through the torque transferring connection 500E or 500 and specifically through the workpiece/bar B.

Exemplarily, in FIG. 9, if the rotary guide-bush 200 having a rotary guide-bush collet 210 with manual clearance adjustment is used such as in FIGS. 1 and 2, the torque transferring connection 500E includes or is realized by the spindle collet 140, the bar B and the freewheels 270B1 and/or 270B2.

Herein the "and/or" in "freewheels 270B1 and/or 270B2" means specifically that in case of bi-directional freewheels both freewheels take part in the function of torque transfer during spindle acceleration and spindle deceleration ("and"), whereas in case of two one-directional freewheels being arranged with opposite locking directions only one of the freewheels takes part in the function of torque transfer during spindle acceleration in a certain rotational direction and only the other freewheel takes part in the function of torque transfer during spindle deceleration in the certain rotational direction, while one of the freewheels is respectively freewheeling ("or"), and for acceleration and deceleration in the other rotational direction, the roles of the freewheels switch.

On the other hand, if the rotary guide-bush 200A having a rotary guide-bush collet 210A is used such as in FIG. 3, the torque transferring connection 500 includes, in addition to the torque transferring connection 500E including or being realized by the spindle collet 140, the bar B and the freewheels 270B1 and/or 270B2, the rotary guide-bush collet 210A which can be switched to rigidly clamp the bar B.

Further, if an extensible joint structure 500B such as exemplarily described in connection with FIG. 4 is used, the overall torque transferring connection would include or be realized by the torque transferring connection 500E or 500, depending on whether the rotary guide-bush collet 210 or 210A is used, and the extensible joint structure 500B.

In any case, in the configuration of FIG. 9, an additional driving mechanism as in FIGS. 1 and 2 does not need to be provided so that the spindle assembly can advantageously be provided as a cost-effective, efficient and compact mechanism.

Figure 10:
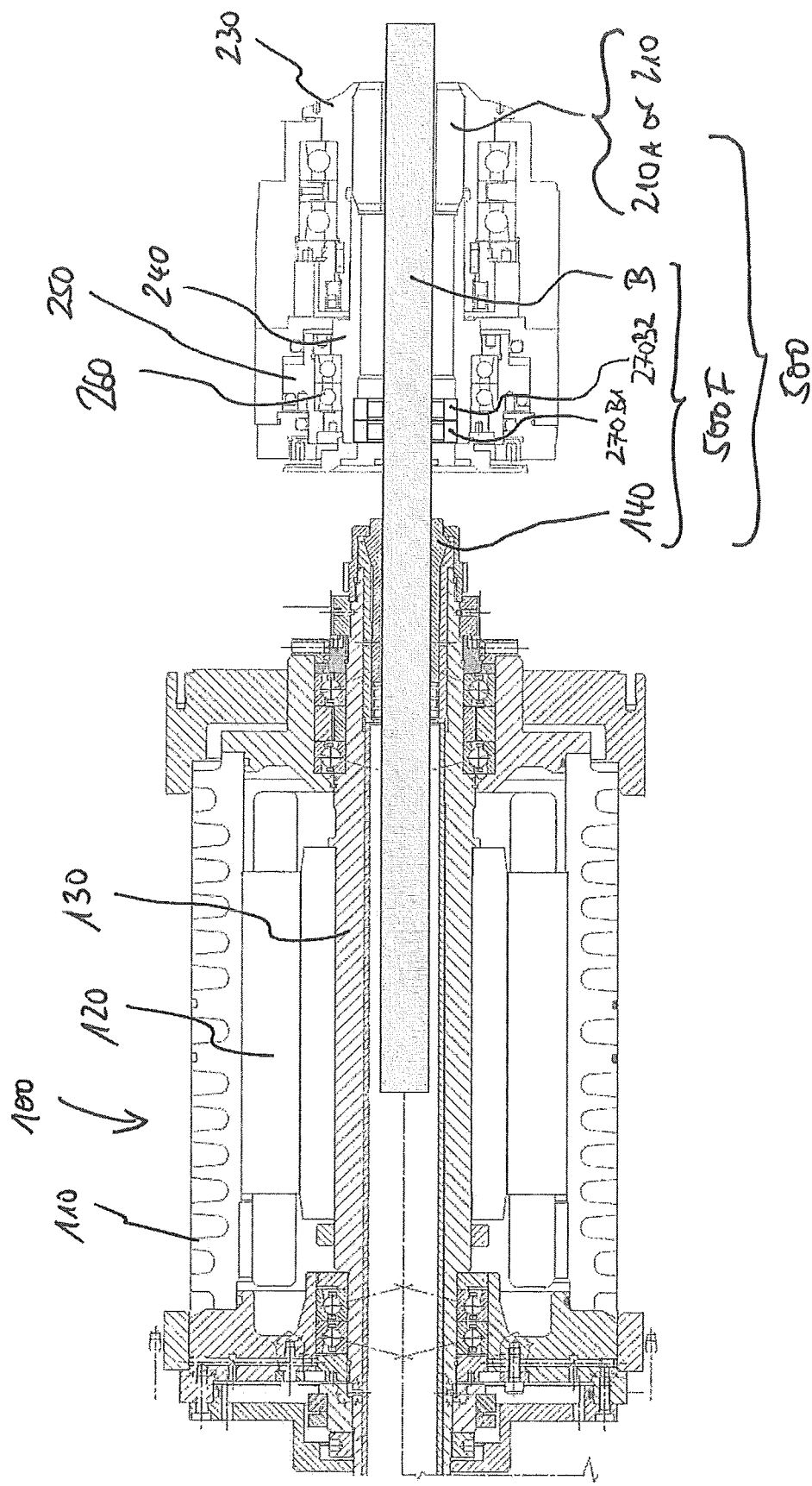
FIG. 10 exemplarily illustrates a schematic sectional view of another exemplary spindle apparatus having a driven rotary guide-bush according to a sixth exemplary embodiment.

FIG. 10 exemplarily illustrates a schematic sectional view of another exemplary spindle apparatus having a driven rotary guide-bush according to a sixth exemplary embodiment.

The exemplary embodiment of FIG. 10 is similar to FIG. 9 with the difference that two freewheels 270B1 and 270B2 are arranged on the opposite side of the rotary guide-bush assembly compared to the rotary guide-bush collet 210 or 210A. Specifically, the two freewheels 270B1 and 270B2 are exemplarily provided on a side of the rotary guide-bush assembly facing the workpiece spindle (i.e. at the rear side of the rotary guide-bush assembly).

This has the advantage that the distance between the freewheels and the spindle collet 140 can be reduced, and such aspect may again limit the critical length of the bar B for torque transmission during acceleration of the spindle, and more slender bars B can still be used to transfer torque during acceleration of the spindle for synchronously driving the rotation of the rotary guide-bush.

Further, two one-directional freewheels may be provided being preferably arranged in opposing locking directions, or two bi-directional freewheels may be preferably provided.

In this exemplary embodiment, the spindle assembly 100 and the rotary guide-bush assembly 200 or 200A are configured to connect to each other, in particular during a phase of acceleration or deceleration of the spindle rotation, by a torque transferring connection 500F or 500 arranged between the spindle assembly 100 and the rotary guide-bush assembly 200 or 200A along the spindle axis so as to transfer driving torque during acceleration or deceleration of the spindle rotation driven by the spindle motor to the rotary guide-bush of the rotary guide-bush assembly 200 or 200A, in particular through the torque transferring connection 500F or 500 and specifically through the workpiece/bar B.

Exemplarily, in FIG. 10, if the rotary guide-bush 200 having a rotary guide-bush collet 210 with manual clearance adjustment is used such as in FIGS. 1 and 2, the torque transferring connection 500F includes or is realized by the spindle collet 140, the bar B and the freewheels 270B1 and/or 270B2.

On the other hand, if the rotary guide-bush 200A having a rotary guide-bush collet 210A is used such as in FIG. 3, the torque transferring connection 500 includes, in addition to the torque transferring connection 500F including or being realized by the spindle collet 140, the bar B and the freewheels 270B1 and/or 270B2, the rotary guide-bush collet 210A which can be switched to rigidly clamp the bar B.

Further, if an extensible joint structure 500B such as exemplarily described in connection with FIG. 4 is used, the overall torque transferring connection would include or be realized by the torque transferring connection 500F or 500, depending on whether the rotary guide-bush collet 210 or 210A is used, and the extensible joint structure 500B.

In any case, in the configuration of FIG. 10, an additional driving mechanism as in FIGS. 1 and 2 does not need to be provided so that the spindle assembly can advantageously be provided as a cost-effective, efficient and compact mechanism.

As mentioned above, in the case of two freewheels such as e.g. in FIGS. 9 and 10, the freewheels can be realized as two one-directional freewheels being arranged with opposite locking directions (i.e. one one-directional freewheel having a clockwise locking direction and a counter-clockwise freewheeling direction and one other one-directional freewheel having a counter-clockwise locking direction and a clockwise freewheeling direction).

FIGS. 11A to 11C exemplarily illustrate schematic sectional views of one-directional freewheel mechanisms 270B for use in spindle apparatuses having a driven rotary guide-bush according to according to exemplary embodiments.

The exemplary freewheel 270B in FIG. 11A is a one-directional freewheel having a clockwise freewheeling direction of the outer ring relative to the inner bar B and a counter-clockwise locking direction, and the freewheel exemplarily includes an outer ring 271 and a plurality of clamping elements 272 (e.g. sprags or rollers) arranged around the inner circumference of the outer ring 271.

The exemplary freewheel 270B in FIG. 11B is a one-directional freewheel having a clockwise freewheeling direction of the outer ring relative to the inner bar B and a counter-clockwise locking direction, and the freewheel exemplarily includes an outer ring 271 and a plurality of spherical clamping elements 272 arranged around the inner circumference of the outer ring 271 inside respective grooves 271A of the outer ring 271 and the clamping elements 272 being biased in a tangential direction towards a narrowing portion of the respective grooves 271A by pins 273 being pushed by pushing elements 274 (such as e.g. springs or rubber elements).

The exemplary freewheel 270B in FIG. 11C is a one-directional freewheel having a clockwise freewheeling direction of the outer ring relative to the inner bar B and a counter-clockwise locking direction, and the freewheel exemplarily includes an outer ring 271 and a plurality of spherical clamping elements 272 (one being shown) arranged around the inner circumference of the outer ring 271 inside respective grooves 271A of the outer ring 271 and the clamping elements 272 being biased in a tangential direction towards a narrowing portion of the respective grooves 271A by a spring portion 273.

Figure 12A:
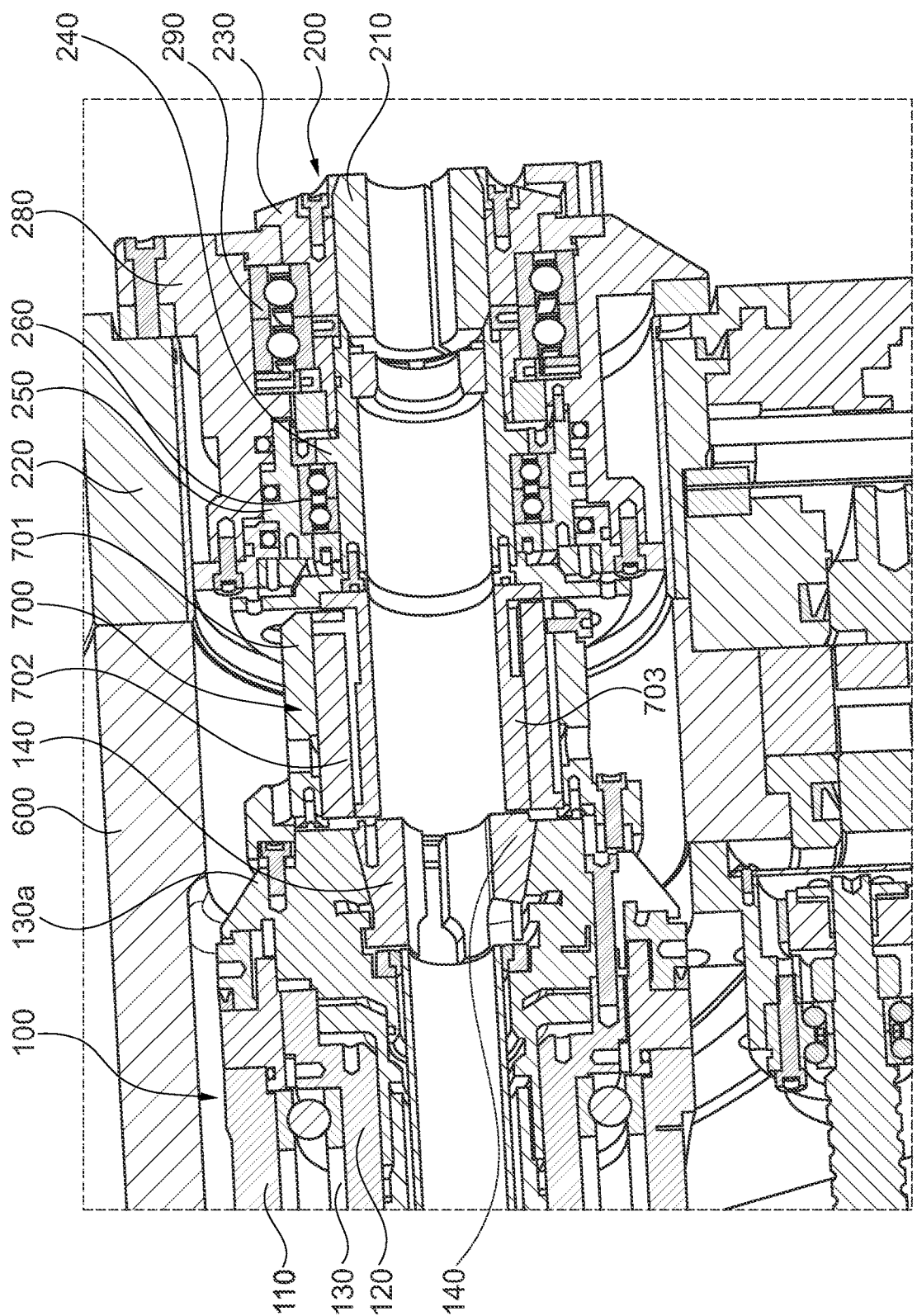
FIGS. 12A and 12B illustrates schematic sectional views of another exemplary spindle apparatus having a driven rotary guide-bush according to a seventh exemplary embodiment.
Figure 12B:
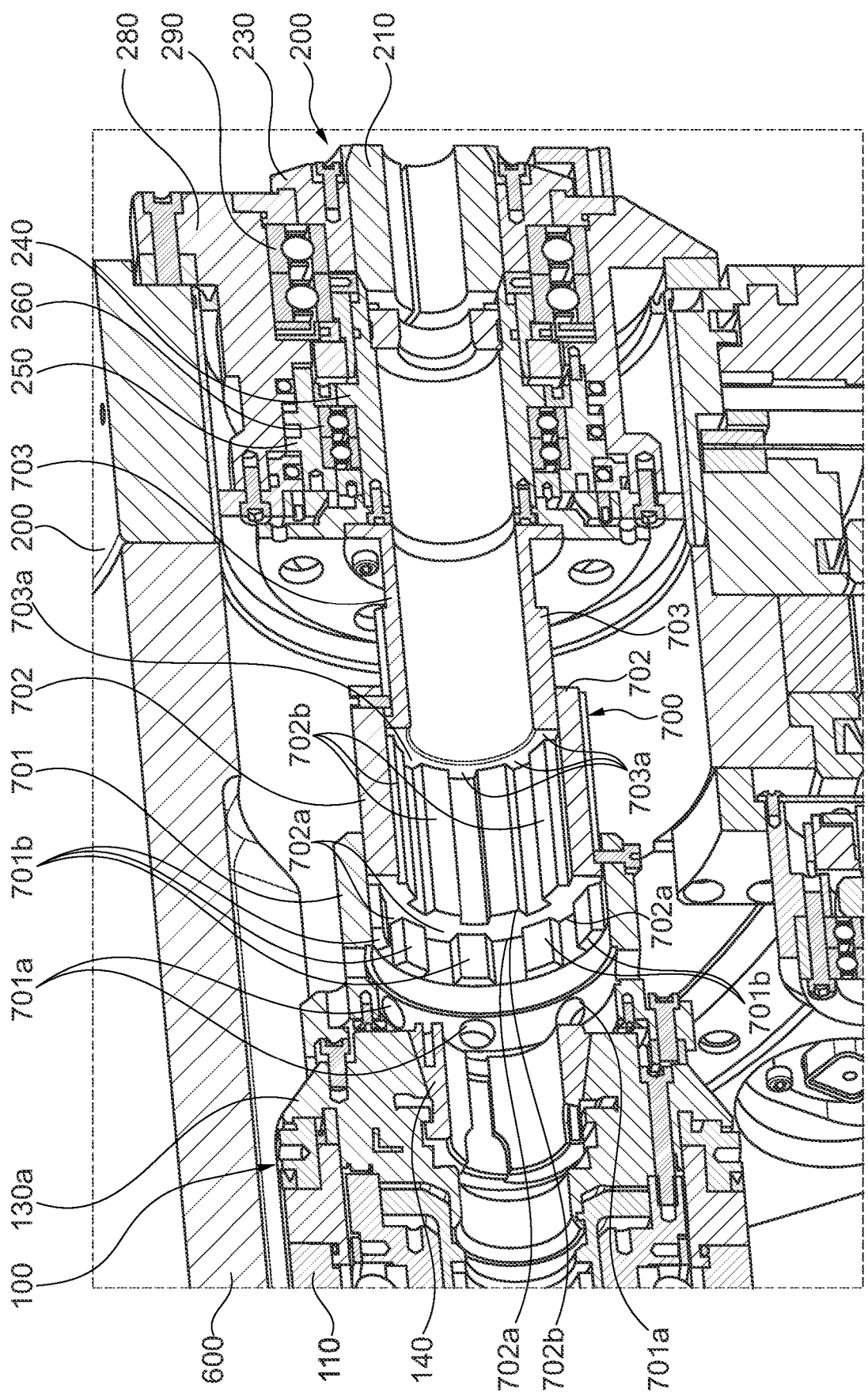

FIGS. 12A and 12B illustrates schematic sectional views of another exemplary spindle apparatus having a driven rotary guide-bush according to a seventh exemplary embodiment.

Exemplarily, the spindle apparatus with spindle assembly 100 again includes the spindle housing 110, the built-in spindle drive 120 and the rotationally-supported hollow spindle shaft 130, and a spindle collet 140 arranged at a front portion of the spindle for clamping the workpiece, such as e.g. the bar B, received at the spindle.

A front flange 130a of the spindle 110 is attached to the spindle shaft 130 at the front face side of the spindle 110, and the spindle collet 140, the spindle shaft 130 and the front flange 130a rotate together about the spindle axis of the spindle 100 within the spindle housing 110, when driven by the spindle drive 120.

Similar as in FIGS. 1 and 2 above, for being able insert the bar B in the spindle 110 or to push/move the bar B into the axial direction of the spindle axis (referred to as Z-direction) with respect to the position of the spindle collet 140, e.g. to move another portion of the bar B towards the machining area where the tools engage with the bar B, the spindle collet 140 can be released (e.g. by actuating the spindle collet 140 to release the bar B).

For such clamping function, to clamp and unclamp (release) the bar B, the spindle collet 140 may be actuated automatically, e.g. electronically, electromagnetically, pneumatically and/or hydraulically.

In front of the spindle, there is provided the axially arranged rotary guide-bush assembly 200 which is exemplarily attached by the mounting structure 220 for mounting the rotary guide-bush to the machine tool, e.g. to a machine frame, to a dedicated support structure, or to a spindle-carrying structure, of a machine tool 600, similar to FIG. 1.

The rotary guide-bush assembly 200 exemplarily includes the rotary guide-bush collet 210 exemplarily arranged at a front portion of the rotary guide-bush assembly 200. The rotary guide-bush collet 210 is exemplarily arranged inside the rotary guide-bush flange 230.

In contrast to a rotary guide-bush assembly with a rotary guide-bush collet with manual clearance adjustment, the rotary guide-bush assembly 200 of this exemplary embodiment exemplarily includes the rotary guide-bush collet 210 with automatic clearance adjustment. That is, the reference numeral 210 in FIGS. 12A and 12B denotes a rotary guide-bush collet with automatic clearance adjustment.

Furthermore, the rotary guide-bush assembly 200 exemplarily includes a sleeve 240 which is rotationally supported by rotary guide-bush bearings 290 in a rotary guide-bush housing 280 of the rotary guide-bush assembly 200 together with the rotationally supported rotary guide-bush collet 210 and the rotary guide-bush flange 230.

Exemplarily, in FIGS. 12A and 12B, the spindle apparatus includes the rotary guide-bush assembly 200 (rotary guide-bushing), being mounted in front of the spindle 100, in particular being arranged such that the bar B as the exemplary workpiece can extend through the rotary guide-bush collet 210 exemplarily arranged at the front side of the rotary guide-bush 200.

Furthermore, for being able to push/move the bar B into the Z-direction, e.g. to move another portion of the bar B towards the machining area where the tools engage with the bar B, e.g. by also unclamping the bar B at the spindle collet 140, the rotary guide-bush collet 210 can be released (e.g. by actuating the rotary guide-bush collet 210 to release the bar B).

For such clamping function, to clamp and unclamp (release) the bar B, the rotary guide-bush collet 210 may be actuated automatically, e.g. electronically, electromagnetically, pneumatically and/or hydraulically.

In the exemplary embodiment of FIGS. 12A and 12B, the rotary guide-bush collet 210 is exemplarily actuated by pneumatic or hydraulic control, and the rotary guide-bush assembly 200 includes a piston 250 and piston bearings 260.

A chamber, in which the piston 250 is arranged, can exemplarily be connected on both sides of the piston 250 with pressure channels being connected to a hydraulic or pneumatic pressure control system.

The hydraulic or pneumatic pressure control system can be configured to actuate at least two states, by being configured to apply hydraulic or pneumatic pressure to either side of the piston 250 so as to actuate either opening of the rotary guide-bush collet 210 to release the bar B or to actuate closing of the rotary guide-bush collet 210 to clamp the bar B.

Depending on the selected pressure level, the clamping state of the rotary guide-bush collet 210 either clamps the bar B (workpiece) more loosely (e.g. to allow for movement of the workpiece in the Z-direction, but with limited or no torque transfer) or rigidly (e.g. to allow for torque transfer).

For automatic clearance adjustment, the low or lowest level pressure level can be adjusted to achieve the appropriate clearance depending on the size/diameter of the workpiece when the rotary guide-bush collet 210 is in the unclamped/released state instead of the clamping state. This has the advantage that the clearance in the released state of the rotary guide-bush collet 210 can be automatically adjusted even between machining different workpieces which might have minor variations in size due to production variations.

In between the spindle 100 and the rotary guide-bush 200, there is exemplarily provided a telescopic coupling tube 700 (extensible joint structure) being attached with one end to a front side of the spindle 100 and with the other end to a rear side of the rotary guide-bush assembly 200.

The telescopic coupling tube 700 joins the spindle 100 and the rotary guide-bush 200 so as to transfer torque during rotation about the spindle axis, but the telescopic coupling tube 700 is configured to extend in length in the Z-direction so as to allow for movement of the spindle 100 in the Z-direction with the rotary guide-bush 200 remaining stationary in Z-position.

Accordingly, the telescopic coupling tube 700 is configured to mechanically elongate/shorten while the spindle 100 slides in the Z-direction.

In this exemplary embodiment, the spindle assembly 100 and the rotary guide-bush assembly 200 are exemplarily configured to connect to each other, at all times, by a torque transferring connection realized by the telescopic coupling tube 700 arranged between the spindle assembly 100 and the rotary guide-bush assembly 200 along the spindle axis so as to transfer driving torque during acceleration or deceleration of the spindle rotation driven by the spindle motor to the rotary guide-bush of the rotary guide-bush assembly 200, in particular through the torque transferring connection realized by the telescopic coupling tube 700 and specifically through the telescopic coupling tube 700.

The telescopic coupling tube 700 exemplarily includes three stages represented exemplarily by the three tube elements 701, 702, 703. Exemplarily, the tube elements 701, 702, 703 are shaped substantially as hollow cylindrical elements, respectively, having different diameters.

Exemplarily, FIG. 12A shows the collapsed state of the telescopic coupling tube 700 and FIG. 12B shows the extended state of the telescopic coupling tube 700.

The first tube element 701 is exemplarily fixedly attached (exemplarily by means of screws) to the front-side portion of the spindle shaft 130, specifically exemplarily to the spindle front flange 130a. Accordingly, the first tube element 701, which extending with its longitudinal direction into the Z-direction axially with the spindle axis, is fixed so as to rigidly rotate together with the spindle shaft 130. The rotation of the spindle shaft 130 thus also drives the rotation of the first tube element 701.

The second tube element 702, which also is extending with its longitudinal direction into the Z-direction axially with the spindle axis, exemplarily has a diameter smaller than the diameter of the first tube element 701 (outer tube element) and is exemplarily slidably inserted within the first tube element 701.

The third tube element 703, which also is extending with its longitudinal direction into the Z-direction axially with the spindle axis, exemplarily has a diameter smaller than the diameter of the second tube element 702 (middle tube element) and is exemplarily slidably inserted within the second tube element 702.

The third tube element 703 (inner tube element) is exemplarily fixedly attached (exemplarily by means of screws) to the back-side portion of the rotary guide bush 200, specifically exemplarily to the back-side of the rotary guide bush sleeve 140. Accordingly, the third tube element 703 is fixed so as to rigidly rotate together with rotary guide bush 200, specifically exemplarily with the rotary guide bush sleeve 140. The rotation of the third tube element 703 thus also drives the rotation of the rotary guide bush 200, specifically exemplarily the rotary guide bush sleeve 140, which rotates together with the rotary guide bush collet 210.

According to the telescopic mechanism of the telescopic coupling tube 700, the second tube element 702 is exemplarily slidably inserted within the first tube element 701 and the third tube element 703 is exemplarily slidably inserted within the second tube element 702.

In the collapsed state of the telescopic coupling tube 700, the second tube element 702 is exemplarily maximally inserted within the first tube element 701 and the third tube element 703 is exemplarily maximally inserted within the second tube element 702 (see e.g. FIG. 12A). In the collapsed state, the longitudinal length of the telescopic coupling tube 700 in the Z-direction is the shortest possible longitudinal length of the telescopic coupling tube 700, and the spindle 100 is arranged at the closest position with respect to the rotary guide bush 200.

Exemplarily, since the second tube element 702 is exemplarily maximally inserted within the first tube element 701 and the third tube element 703 is exemplarily maximally inserted within the second tube element 702 (see e.g. FIG. 12A), and since the longitudinal length of the three tube elements 701, 702, and 703 is exemplarily substantially equal to each other, the closest position/shortest distance of the spindle 100 with respect to the rotary guide bush 200 is substantially given by the longitudinal length the individual tube elements.

In other exemplary embodiments, the longitudinal length of the tube elements can be different, so that the closest position/shortest distance of the spindle 100 with respect to the rotary guide bush 200 is substantially given by the longitudinal length of the longest one of the tube elements.

On the other hand, as exemplarily shown in FIG. 12B in the extended state of the telescopic coupling tube 700, the second tube element 702 is exemplarily retracted out of the first tube element 701, so that only an end portion of the second tube element 702 remains held within the first tube element 701, and the third tube element 703 is exemplarily retracted out of the second tube element 702, so that only an end portion of the third tube element 703 remains held within the second tube element 702 (see e.g. FIG. 12B). For avoiding that the tube elements are retracted further or even separated from each other, the telescopic coupling tube 700 includes stopper elements exemplarily realized as stopper bolts (exemplarily attached to each of the first and second tube elements).

Exemplarily, the farthest position/largest distance of the spindle 100 with respect to the rotary guide bush 200 is substantially given, due to the overlaps of the tube elements in the extended shape, by less than three times the longitudinal length the individual tube elements. Preferably, the farthest position/largest distance of the spindle 100 with respect to the rotary guide bush 200 is larger than twice the longitudinal length the individual tube elements.

Exemplarily, in the embodiments of FIGS. 12A and 12B, the largest diameter tube element is arranged closest to the spindle and the diameters of the tube elements decrease towards the rotary guide bush. This has the advantage that the stronger and more robust torque transmission mechanism can be provided since the driving side (i.e. the spindle side) is fixedly attached to the largest diameter tube element, having the larger moment of inertia among the tube elements.

Further exemplarily, in the exemplary embodiment of FIGS. 12A and 12B, the tube element 701 having the largest diameter, i.e. the outer tube element, has a plurality of through holes 701a formed in the tube wall of the outer tube element along a ring-shape about the longitudinal axis. Exemplarily, since the outer tube element is attached to the spindle 100, the through holes 701a are exemplarily arranged adjacent to the spindle 100. This has the advantage that the through holes 701a are covered by the middle tube element substantially only in the collapsed state of the telescopic coupling tube mechanism 700, whereas the through holes 701a remain uncovered by the middle tube element as soon as the telescopic coupling tube mechanism 700 expands in the longitudinal direction thereof.

Accordingly, the through holes 701a remain uncovered by the middle tube element in the majority of possible expansion states up to the extended state (maximal expansion, as exemplarily shown in FIG. 12B).

An advantage of the through holes 701a is that cooling and lubricating liquid that may be collected inside the telescopic coupling tube mechanism 700 between the rotary guide bush 200 and the spindle 100 during machining of a workpiece, is advantageously enabled to flow out of the rotating telescopic coupling tube mechanism 700 through the through holes 701a and is avoided to flow into the spindle 100.

In preferred embodiments, through holes 701a are formed in the largest outer tube element on the end side opposing the middle tube element, within a half-tube end portion of the largest outer tube element on the end side opposing the middle tube element or preferably within a third-tube end portion of the largest outer tube element on the end side opposing the middle tube element.

In other exemplary embodiments, in which the largest outer tube element is attached to the rotary guide bush, a plurality of through holes may also be formed in the tube wall of the outer tube element along a ring-shape about the longitudinal axis. Exemplarily, when the outer tube element is attached to the spindle, the through holes can be exemplarily arranged adjacent to the rotary guide bush. This would then also have the advantage that the through holes were covered by the middle tube element substantially only in the collapsed state of the telescopic tube mechanism, whereas the through holes would still remain uncovered by the middle tube element as soon as the telescopic coupling tube mechanism expands in the longitudinal direction thereof.

As exemplarily shown in FIG. 12B, the tube elements 701 to 703 are adapted in their profile shape to slidably fit substantially without clearance within the respective larger tube element, in particular preferably along the longitudinal length thereof. That is, the middle tube element 702 is adapted in its profile shape to slidably fit substantially without clearance within the outer tube element 701, while the inner tube element 703 is adapted in its profile shape to slidably fit substantially without clearance within the outer tube element 702. This provides an advantage that an axial stability of the telescopic coupling tube mechanism 700 can be maintained in any of the possible expansion states between the collapsed state and the extended state.

Furthermore, to further improve the axial stability and the torque transmission characteristics of the telescopic coupling tube mechanism 700, the tube elements 701 to 703 include longitudinally extending guide protrusions, please see e.g. FIG. 12B Exemplarily, the inner wall portion of the outer tube element 701 has a plurality of longitudinally extending guide protrusions 701b which exemplarily protrude radially inward. On the other hand, the outer wall portion of the middle tube element 702 has a plurality of longitudinally extending guide protrusions 702a which exemplarily protrude radially outward.

The guide protrusions 701b of the outer tube element 701 exemplarily respectively protrude into the regions between two neighboring guide protrusions 702a of the middle tube element 702, and the guide protrusions 702a of the middle tube element 702 exemplarily respectively protrude into the regions between two neighboring guide protrusions 701b of the outer tube element 701.

Exemplarily, the guide protrusions 702a of the middle tube element 702 exemplarily are shaped to be slidably guided substantially without clearance in the longitudinal direction between two neighboring guide protrusions 701b of the outer tube element 701, when the middle tube element 702 moves in the longitudinal direction with respect to the outer tube element 701, while the guide protrusions 701b of the outer tube element 701 exemplarily are shaped to be slidably guided substantially without clearance in the longitudinal direction between two neighboring guide protrusions 702a of the middle tube element 702.

Further exemplarily, the inner wall portion of the middle tube element 702 has a plurality of longitudinally extending guide protrusions 702b which exemplarily protrude radially inward. On the other hand, the outer wall portion of the inner tube element 703 has a plurality of longitudinally extending guide protrusions 703a which exemplarily protrude radially outward.

The guide protrusions 702b of the middle tube element 702 exemplarily respectively protrude into the regions between two neighboring guide protrusions 703a of the inner tube element 703, and the guide protrusions 703a of the inner tube element 702 exemplarily respectively protrude into the regions between two neighboring guide protrusions 702b of the middle tube element 702.

Exemplarily, the guide protrusions 703a of the inner tube element 703 exemplarily are shaped to be slidably guided substantially without clearance in the longitudinal direction between two neighboring guide protrusions 702b of the middle tube element 702, when the middle tube element 702 moves in the longitudinal direction with respect to the inner tube element 701, while the guide protrusions 702b of the middle tube element 702 exemplarily are shaped to be slidably guided substantially without clearance in the longitudinal direction between two neighboring guide protrusions 703a of the inner tube element 703.

By the above configuration, the axial stability can be further improved by the slidably engaged guide protrusions which extend in the longitudinal direction, while furthermore the torque transmission characteristics of the telescopic coupling tube mechanism 700 can be improved by the meshed guide protrusions.

Accordingly, the telescopic coupling tube mechanism 700 can be provided with significantly improved axial stability and torque transmission for synchronously driving a rotation of the rotary guide bush 200 by the spindle rotation without additional drives or drive mechanisms at the rotary guide bush, wherein furthermore the possibility of unobstructed movement of the spindle 100 in the longitudinal direction can be provided at a compact and cost-effective structure. Exemplarily, in FIGS. 12A and 12B, the torque transferring connection may include the telescopic coupling tube 700 as single torque transferring connection, specifically if the rotary guide-bush 200 having a rotary guide-bush collet 210 with manual clearance adjustment is used. On the other hand, in further exemplary embodiments, it is also possible to provide further torque transferring connections, e.g. by the mechanism as described above in connection with FIG. 3.

In any case, in the configuration of FIGS. 12A and 12B, an additional driving mechanism as in FIGS. 1 and 2 does not need to be provided so that the spindle assembly can advantageously be provided as a cost-effective, efficient and compact mechanism.

In addition to the above exemplary embodiments, further exemplary embodiments can be provided, and it is especially possible to arrange multiple (two, three, four or more) freewheels, e.g. based on preferred positions shown in FIGS. 6, 7, 9, and 10.

In all of the above exemplary embodiments, the rotary guide-bush collet 210 may preferably be realized as a double taper collet.

By exemplary embodiments as described above, there are proposed beneficial aspects and features to enhance the machining options by providing compact, cost-effective and simple driven rotary guide-bush assemblies for use at workpiece carrying spindles, e.g. of a lathe, to provide a compact and reliable driven rotary guide-bush concept.

While certain exemplary embodiments have been described and shown in the accompanying drawings, it is to be understood that such embodiments are merely illustrative of and are not restrictive on the broad invention, and that the embodiments of invention are not limited to the specific constructions and arrangements shown and described, since various other changes, combinations, omissions, modifications and substitutions, in addition to those set forth in the above paragraphs, are possible.

Those skilled in the art will appreciate that various adaptations, modifications, and/or combination of the just described embodiments can be configured without departing from the scope of disclosure of the present invention. Those skilled in the art will also appreciate, in view of this disclosure, that different embodiments of the invention described herein may be combined to form other embodiments of the invention. Therefore, it is to be understood that, the invention may be practiced other than as specifically described herein.

The invention claimed is:

1. A spindle apparatus for use with a machine tool, comprising:
    a spindle assembly including a workpiece spindle being configured to receive an elongated workpiece and a spindle motor for driving a spindle rotation of the workpiece spindle about a spindle axis of the workpiece spindle; and
    a rotary guide-bush assembly being axially arranged with the workpiece spindle with respect to the spindle axis, the rotary guide-bush assembly including a rotary guide-bush configured to receive the elongated workpiece and being supported at the rotary guide-bush assembly to rotate with the elongated workpiece received in the workpiece spindle about the spindle axis while enabling a movement of the elongated workpiece in the direction of the spindle axis;
    wherein
    the spindle assembly and the rotary guide-bush assembly are configured to connect to each other by a torque transferring connection arranged between the spindle assembly and the rotary guide-bush assembly along the spindle axis so as to transfer driving torque during acceleration or deceleration of the spindle rotation driven by the spindle motor to the rotary guide-bush of the rotary guide-bush assembly,
    the torque transferring connection comprises an extensible joint structure, the extensible joint structure including a telescopic coupling tube mechanism having a plurality of tube elements, the telescopic coupling tube mechanism being arranged axially with respect to the spindle axis, and
    a plurality of through holes are formed in a tube wall of an outer tube element of the telescopic coupling tube mechanism having a largest diameter among the tube elements, so that the outer tube element is configured to enable outflow of cooling and/or lubricating liquid from the inside of the telescopic coupling tube mechanism to its outside.

2. The spindle apparatus according to claim 1, wherein
    the extensible joint structure is attached to the spindle assembly and the rotary guide-bush assembly, and
    the extensible joint structure is configured to transfer driving torque during acceleration or deceleration of the spindle rotation and is further configured to expand and/or shorten in the direction of the spindle axis.

3. The spindle apparatus according to claim 1, wherein
    the plurality of tube elements includes tube elements of different diameters, one tube element of the tube elements being attached to the spindle assembly and another one of the tube elements being attached to the rotary guide-bush assembly.

4. The spindle apparatus according to claim 3, wherein
    the outer tube element of the plurality of tube elements having the largest diameter among the tube elements is attached to the spindle assembly, and/or
    an inner tube element of the plurality of tube elements having the smallest diameter among the tube elements is attached to the rotary guide-bush assembly.

5. The spindle apparatus according to claim 1, wherein
    the plurality of through holes are formed along a ring-shaped portion around the longitudinal axis of the telescopic coupling tube mechanism.

6. The spindle apparatus according to claim 5, wherein
    the tube elements of the telescopic coupling tube mechanism are configured to transfer the driving torque in that a rotation of the tube elements relative to each other about the spindle axis is blocked.

7. The spindle apparatus according to claim 1, wherein
    the tube elements of the telescopic coupling tube mechanism are configured to transfer the driving torque in that a rotation of the tube elements relative to each other about the spindle axis is blocked.

8. The spindle apparatus according to claim 7, wherein
    the outer tube element includes, on its inner wall portion, a plurality of longitudinally extending guide protrusions protruding radially inward, and an inner-next tube element, which is slidably held within the outer tube element, includes, on its outer wall portion, a plurality of longitudinally extending guide protrusions protruding radially outward, inbetween two adjacent longitudinally extending guide protrusions of the outer tube element; and/or
    the inner tube element includes, on its outer wall portion, a plurality of longitudinally extending guide protrusions protruding radially outward, and an outer-next tube element, in which the inner tube element is slidably held, includes, on its inner wall portion, a plurality of longitudinally extending guide protrusions protruding radially inward, inbetween two adjacent longitudinally extending guide protrusions of the inner tube element.

9. An apparatus comprising:
    a machine tool;
    a spindle assembly including a workpiece spindle being configured to receive an elongated workpiece and a spindle motor for driving a spindle rotation of the workpiece spindle about a spindle axis of the workpiece spindle; and
    a rotary guide-bush assembly being axially arranged with the workpiece spindle with respect to the spindle axis, the rotary guide-bush assembly including a rotary guide-bush configured to receive the elongated workpiece and being supported at the rotary guide-bush assembly to rotate with the elongated workpiece received in the workpiece spindle about the spindle axis while enabling a movement of the elongated workpiece in the direction of the spindle axis;
    wherein
    the spindle assembly and the rotary guide-bush assembly are configured to connect to each other by a torque transferring connection arranged between the spindle assembly and the rotary guide-bush assembly along the spindle axis so as to transfer driving torque during acceleration or deceleration of the spindle rotation driven by the spindle motor to the rotary guide-bush of the rotary guide-bush assembly,
    the torque transferring connection comprises an extensible joint structure, the extensible joint structure including a telescopic coupling tube mechanism having a plurality of tube elements, the telescopic coupling tube mechanism being arranged axially with respect to the spindle axis, and a plurality of through holes are formed in a tube wall of an outer tube element of the telescopic coupling tube mechanism having a largest diameter among the tube elements, so that the outer tube element is configured to enable outflow of cooling and/or lubricating liquid from the inside of the telescopic coupling tube mechanism to its outside.

\* \* \* \* \*